(12) United States Patent
Belardinelli et al.

(10) Patent No.: US 10,322,480 B2
(45) Date of Patent: Jun. 18, 2019

(54) PRODUCTION LINE PROVIDED OF ONE OR MORE MODULES FOR CARRYING CONTAINERS FOR SUPPLYING PARTS OR COMPONENTS TO ASSEMBLY STATIONS ALONG THE LINE

(71) Applicant: Comau S.p.A., Grugliasco (Turin) (IT)

(72) Inventors: Simone Belardinelli, Grugliasco (IT); Ugo Ghirardi, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 0 days.

(21) Appl. No.: 15/879,710

(22) Filed: Jan. 25, 2018

(65) Prior Publication Data

US 2018/0214998 A1    Aug. 2, 2018

(30) Foreign Application Priority Data

Jan. 30, 2017    (EP) .................................... 17153708

(51) Int. Cl.
| | |
|---|---|
| B23P 19/00 | (2006.01) |
| B23P 21/00 | (2006.01) |
| B65G 17/14 | (2006.01) |
| B65G 43/00 | (2006.01) |
| B65G 43/08 | (2006.01) |

(52) U.S. Cl.
CPC ........... *B23P 21/008* (2013.01); *B23P 19/001* (2013.01); *B23P 21/004* (2013.01); *B65G 17/14* (2013.01); *B65G 43/00* (2013.01); *B65G 43/08* (2013.01)

(58) Field of Classification Search
CPC .............................. B23P 21/008; B23P 19/001
See application file for complete search history.

(56) References Cited

U.S. PATENT DOCUMENTS 6,854,815 B1    2/2005    Smith

FOREIGN PATENT DOCUMENTS

| | | |
|---|---|---|
| CH | 663882 A5 | 1/1988 |
| DE | 2431398 A1 | 1/1976 |
| DE | 3539115 A1 | 5/1987 |
| DE | 8811524 U1 | 2/1989 |
| DE | 102006061423 A1 | 6/2008 |
| EP | 0458722 B1 | 7/1994 |
| EP | 2757059 A1 | 7/2014 |
| EP | 3241646 A1 | 11/2017 |
| JP | S4945270 A | 4/1974 |
| JP | S4956376 A | 5/1974 |
| JP | S56142637 U | 10/1981 |
| JP | H0648516 A | 2/1994 |
| JP | 2006320990 A | 11/2006 |
| JP | 2011207615 A | 10/2011 |
| JP | 2012196752 A | 10/2012 |
| WO | 9215510 A1 | 9/1992 |

*Primary Examiner* — Jacob S. Scott
*Assistant Examiner* — Lester Ill Rushin
(74) *Attorney, Agent, or Firm* — Young Basile Hanlon & MacFarlane, P.C.

(57) ABSTRACT

A production line comprises at least one assembly station which is electronically controlled, in which a chain-conveyor device feeds with continuous motion a plurality of pallets carrying parts to be assembled. The production line further comprises at least one module for carrying containers provided with a plurality of part-holder containers for supplying parts to said at least one assembly station. The module comprises a plurality of drawers associated to a paternoster conveyor system.

16 Claims, 26 Drawing Sheets

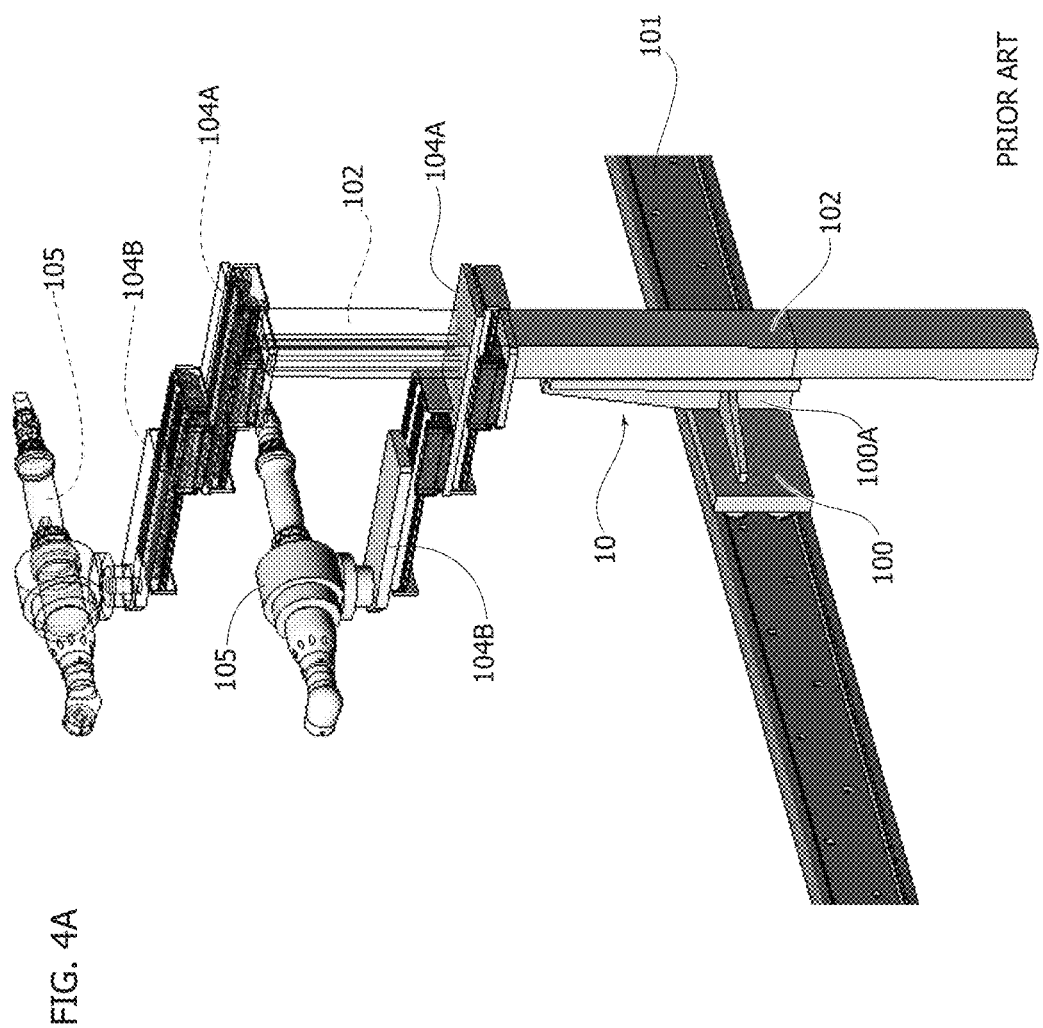

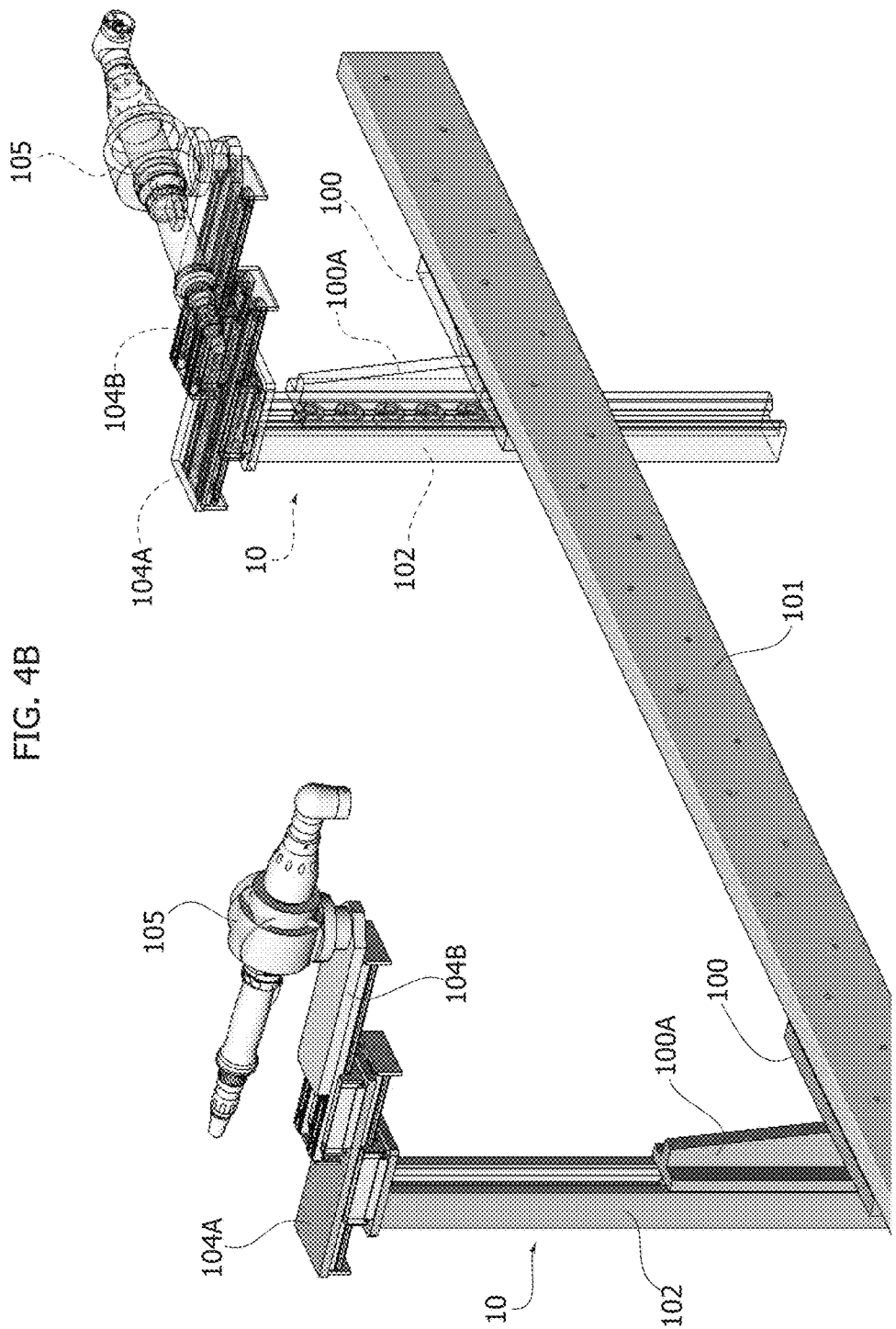

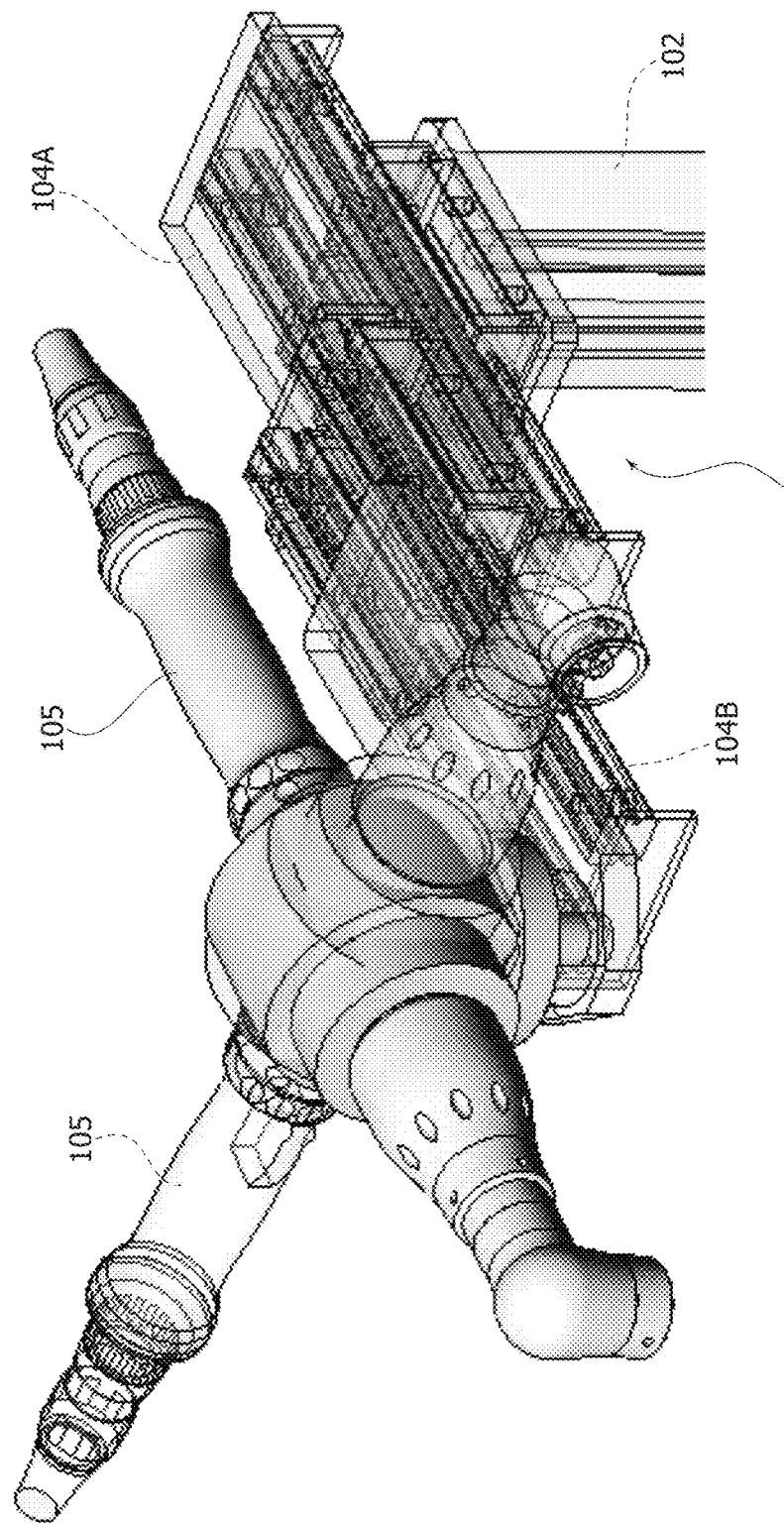

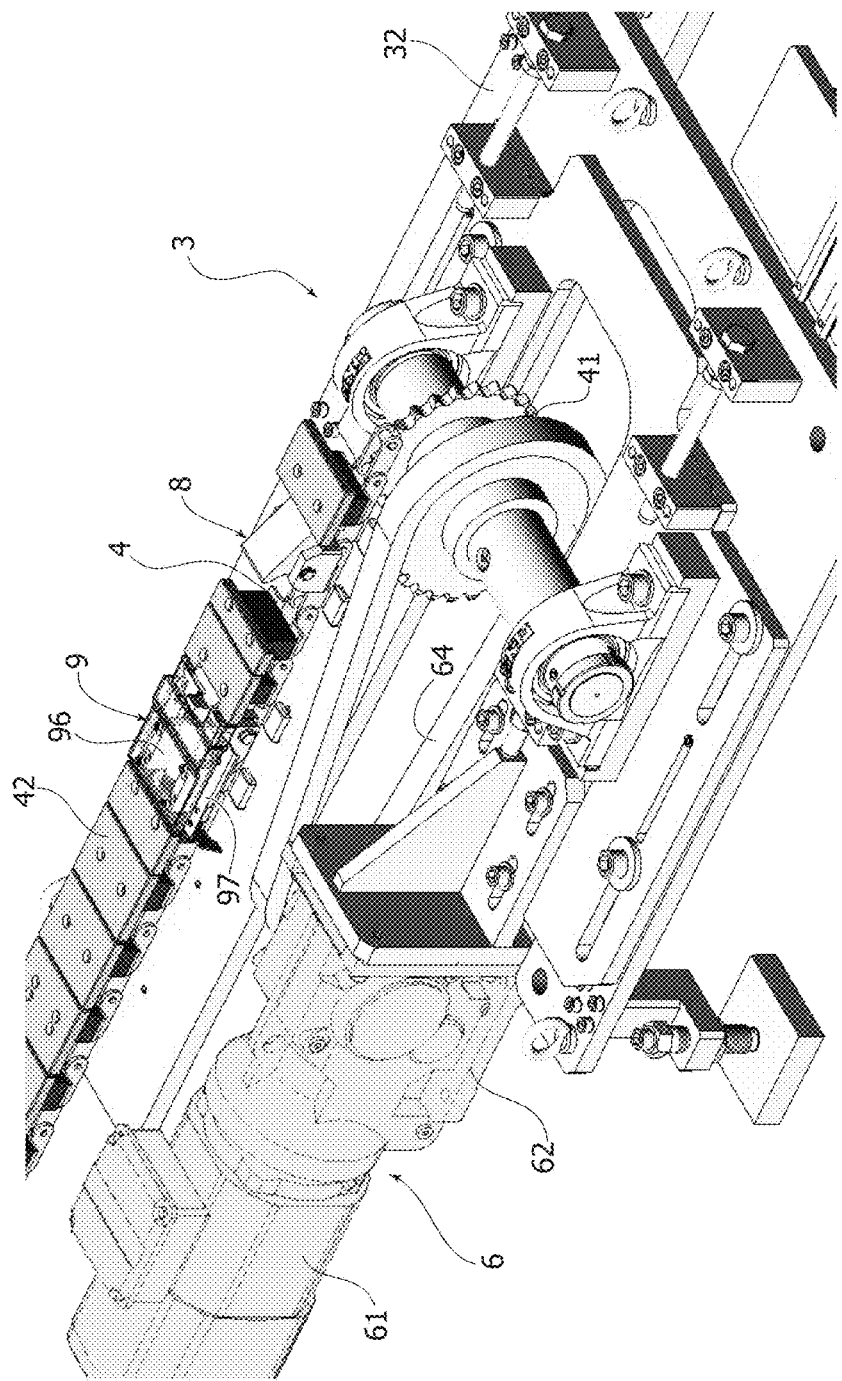

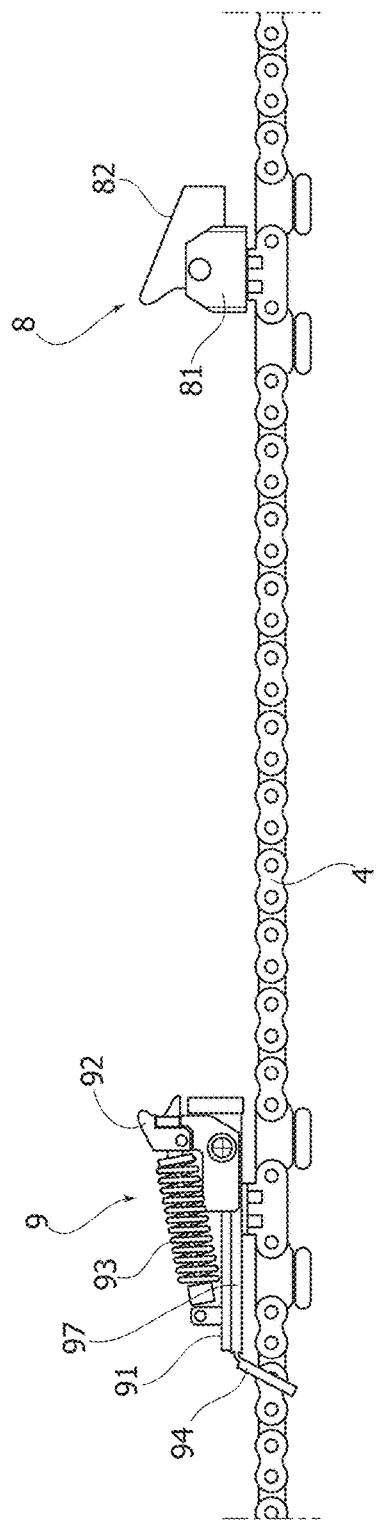

PRODUCTION LINE PROVIDED OF ONE OR MORE MODULES FOR CARRYING CONTAINERS FOR SUPPLYING PARTS OR COMPONENTS TO ASSEMBLY STATIONS ALONG THE LINE

CROSS-REFERENCE TO RELATED APPLICATIONS

This application claims priority benefit to European Patent Application No. 17153708.7 filed Jan. 30, 2017, the entire contents of which is incorporated by reference.

TECHNICAL FIELD

The present invention relates to a production line provided of one or more modules for carrying containers for supplying parts or components to assembly stations along the line.

BACKGROUND

In the European patent application No. EP 1 616 8061.6, the present applicant proposed a production line including:
  at least one assembly station;
  a chain-conveyor device comprising a chain for conveying a plurality of pallets along said production line, wherein each pallet is provided for conveying pieces to be assembled;
  motor means for moving said chain; and
  an electronic control system,
  said motor means and said electronic control system being configured for feeding the aforesaid pallets conveyed by said chain with continuous movement through said at least one assembly station,
  said production line being characterized in that:
  associated to said at least one assembly station there is a tool guided on a supporting structure in such a way as to be freely mobile in the direction of conveyance of the pallets, so that said tool can be used by an operator assigned to the assembly station for carrying out manual assembly operations on the parts conveyed by each pallet, said tool thus being adapted to be pulled by the operator while the latter follows the pallet in its continuous movement through the assembly station, for carrying out the aforesaid manual operations;
  in association with each pallet, said chain is provided with a front hook assembly and a rear hook assembly set at a longitudinal distance apart from one another and designed to engage the pallet for referencing the pallet with respect to said chain and for feeding the pallets together with the chain;
  said rear hook assembly being designed to disengage from the pallet when an obstacle prevents the pallet from advancing together with the chain, and to move, in this condition, into a position of optical-beam interception, in which a first interception element forming part of the rear hook assembly intercepts a first optical beam emitted by a first optical sensor; and
  said electronic control system being programmed for generating a control signal when said first optical beam is intercepted by said first interception element.

The production line proposed above presents the advantage of rendering production efficient and in particular of rendering assembly operations carried out by the operators convenient and fast, at the same time guaranteeing that the assembly operations are carried out in a complete and correct way and ensuring a high degree of safety for the operators.

A further advantage of the above production line is that of guaranteeing a constant monitoring of the state of assembly of the parts and correct execution of the assembly operations.

Yet a further advantage consists in the fact that the above production line is simple and can be easily integrated in various parts of the layout of a production environment and easily adapted to assembly of parts of different types and dimensions.

Furthermore, the production line previously proposed is ergonomic for the operators who interact with the automated systems of the line, which enables increase of productivity and guarantee for the operators an operating mode that involves as little physical stress as possible.

SUMMARY

An object of the present invention is to improve further the production line previously proposed by the present applicant, improving the efficiency with which the operators are supplied with the parts and components that are necessary to them during execution of a working cycle and improving the logistics of distribution of the above parts and components to the various assembly stations in an industrial plant.

A further object is to improve further the advantages of the production line proposed previously from the standpoint of ergonomics, enabling the operators to work always in comfortable and convenient conditions, without the need to assume postures or make efforts that are physically challenging for the operators over time.

With a view to achieving the aforesaid purposes, the subject of the invention is a production line that presents all the characteristics referred to at the beginning of the present description and is moreover equipped with at least one module for carrying containers that is provided with a plurality of part-holder containers for supplying parts to said at least one assembly station, wherein said module comprises a plurality of drawers associated to a paternoster conveyor system.

According to a fundamental characteristic of the invention, the paternoster conveyor system includes a chain-transmission system, for conveying the aforesaid drawers along an endless-loop path including a front vertical branch, a rear vertical branch, a top horizontal branch, and a bottom horizontal branch, the drawers being arranged according to a fixed pitch along the endless-loop path. Furthermore, the chain-conveyor system comprises two lateral endless chains, connected to which are the sides of the drawers, and the aforesaid endless chains are engaged on chain wheels rotatably mounted on a load-bearing structure of the module and connected to an electronically controlled driving motor.

According to a further important characteristic of the invention, each of the drawers has two opposite side walls facing the lateral chains, and rigidly mounted on each of the side walls is a first engagement element engaged on a second engagement element carried by a respective lateral chain, in such a way that each drawer is carried and moved by the chain-transmission system when the driving motor is activated, along the aforesaid endless-loop path, performing a step of ascent along the rear vertical branch and a step of descent along the front vertical branch of the drawers.

Preferably, the load-bearing structure of the module is provided with lateral guide rails for the drawers, each configured according to an endless loop mounted in the proximity of a respective lateral chain, and on each of the side walls of the drawers there is moreover rotatably mounted a wheel engaged in a respective lateral guide rail.

According to a further characteristic of the invention, the above lateral guide rails are configured in such a way that the drawers maintain a horizontal orientation along the endless-loop path except for a final portion of the step of descent in which the drawers are brought to tilt forwards and downwards, to favour access to each drawer for the operator.

Furthermore, according to another preferred characteristic of the invention, the module for carrying containers is prearranged for being conveyed on board an AGV (Automated Guided Vehicle) or for being positioned on a movable carriage, manually or by means of a motor-driven movement system, in such a way that the module can be positioned according to the production requirements in the proximity of a selected assembly station.

The use in the production line of one or more modules of the type referred to above enables improvement of the efficiency with which the operators are supplied with the parts and components that are necessary to them during execution of a working cycle and more in general to improve the logistics of distribution of the parts and components to the various assembly stations. Furthermore, the module mentioned above enables the operators to work always in comfortable and convenient conditions, without the need to assume postures or make efforts that, if repeated over a prolonged time, may be physically challenging to the operators. This advantage derives primarily from the possibility of actuating the paternoster system for positioning any drawer of the module in a predetermined position, preferably a position at a convenient height for the operator. The further possibility of providing guides that force the drawers to tilt forwards and downwards in the pick-up area further favours access to each drawer by the operator. Consequently, the module according to the invention can also have a height considerably higher than that of a man, it being possible for the operator to translate each drawer to a convenient height for being picked up.

According to a first mode of use, in the case where an assembly station is dedicated to the production of units (e.g., internal-combustion engines or cylinder heads) of a single type, each module can have each of its drawers containing a kit with all the parts or components that the operator must mount in that assembly station on each unit produced. At the end of a working cycle on a specific unit the paternoster system is actuated for moving a new kit into the position for being picked up by the operator. However, it is also possible to envisage that each drawer of the module contains just one component or part of the series of parts or components that are to be assembled on each unit in each working cycle. In this case, the paternoster system is actuated as the operator mounts the various parts on one and the same unit, with the advantage of ruling out the possibility of errors in the assembly sequence.

The module according to the invention affords, however, further important advantages in the case of assembly stations prearranged for producing units of different types or models, according to a mix that is a function of the production demands. In this case, according to the mix envisaged of the different types or models to be produced, and consequently according to the succession envisaged of the parts or components that are necessary, it is possible to provide the drawers of the module with parts or components corresponding to the necessary assembly sequence. The module according to the invention affords in this case the further advantage of being flexibly adaptable to unexpected situations, such as an alteration of the assembly sequence previously programmed (for instance following upon rejection of a part owing to insufficient quality). In this case, the operator can remedy by actuating the paternoster system for accessing the drawer containing the new component required, without any need to stop production. The drawers of the module may also be prearranged with more versions of one and the same component to be assembled, that are different from one another as regards dimensions and can be selected according to specific measurements made during the process sequence.

BRIEF DESCRIPTION OF THE DRAWINGS

Further characteristics and advantages of the invention will emerge from the ensuing description with reference to the annexed drawings, which are provided purely by way of non-limiting example and in which FIGS. 1-8 are identical to the corresponding figures of the patent application No. European EP 1 616 8061.6; in particular:

FIG. 1 is a perspective view of an embodiment of the production line;

FIG. 3 is an alternate perspective view in elevation of an operator who interacts with the automatic assistance system illustrated in FIG. 2B;

FIGS. 4A-4C are alternate perspective views showing alternate positions of a mobile tool;

FIG. 5 is a perspective view of motor means of the production line;

FIGS. 6A-6B are side views of hook assemblies of the pallets in two respective different operating configurations;

FIG. 7 is a cross-sectional view of a pallet conveyed by the production line;

FIG. 8 is a perspective view of a hook assembly in the operating configuration illustrated in FIG. 6B;

DETAILED DESCRIPTION

Described in what follows is the production line that is illustrated in the annexed FIGS. 1-8, already present in the prior patent application No. EP 1 616 8061.6 filed in the name of the present applicant, this description being useful for an understanding of the present invention, and herein incorporated by reference.

Figure 1:
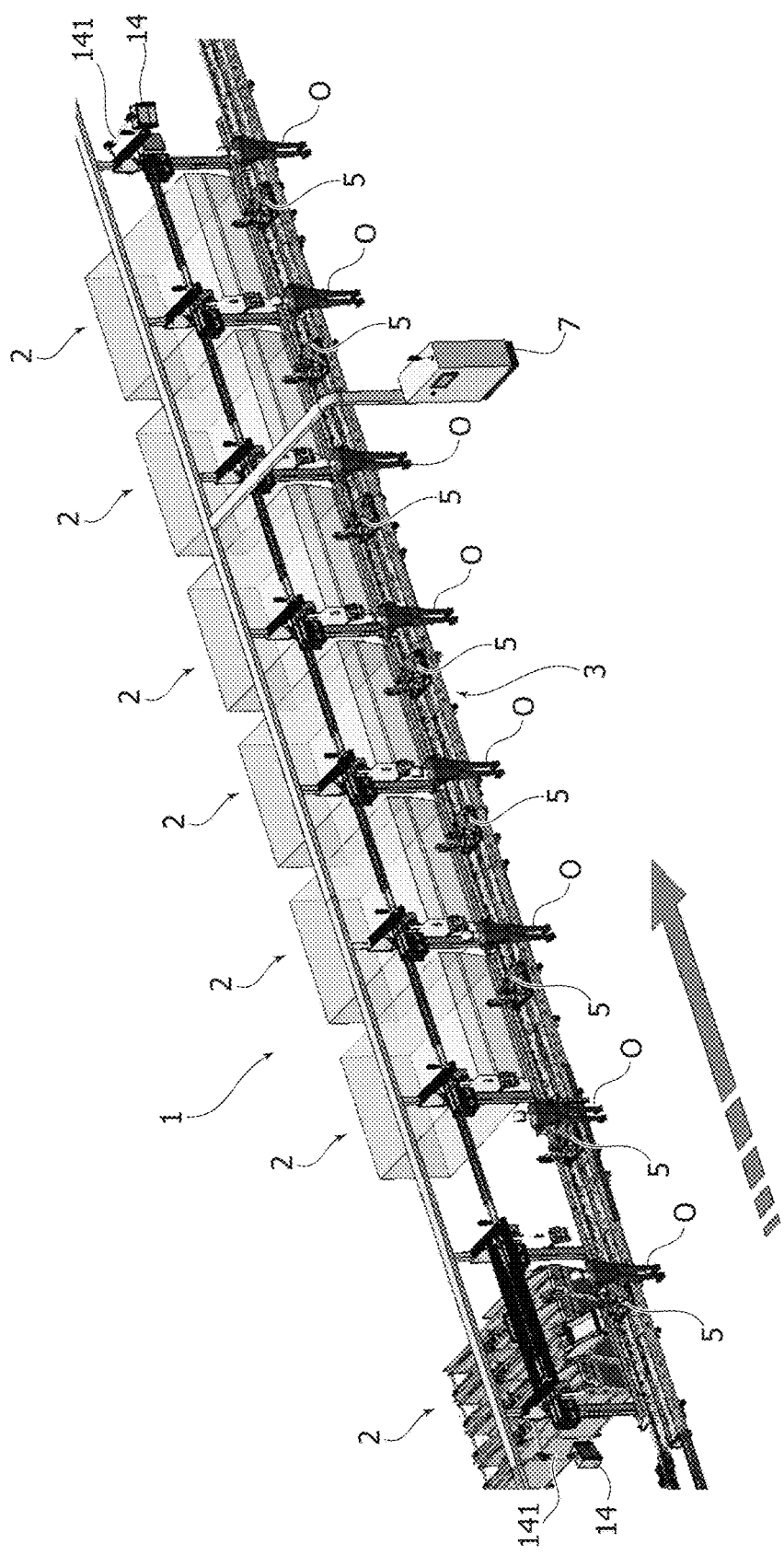

With reference to FIG. 1, number 1 designates as a whole a production line of the continuously moving type, comprising a plurality of assembly stations 2 set in series with respect to one another, where assigned to each assembly station 2 is an operator O. The production line may also be provided with just one assembly station 2.

The line 1 moreover includes a chain-conveyor device 3 mounted adjacent to the assembly stations and prearranged for enabling conveyance of a plurality of pallets 5 along the line 1. Each pallet 5 is prearranged, for example, for bringing a base part (e.g., a cylinder head) on which the operator O manually assembles further components.

In one embodiment of the production line, the pallet 5 is provided in conformance with what has been illustrated in the patent application No. EP 15 153 558.0 filed in the name of the present applicant, and incorporated by reference.

As illustrated in the drawings and mentioned previously, assigned to each of the aforesaid assembly stations 2 is an operator O who operates on the parts conveyed by the pallets 5 that move with continuous motion in front of him. Each operator operates on all the pallets that pass through the assembly station 2 controlled by him. For each pallet that moves with continuous motion through the station, the operator carries out the necessary assembly operations on the part conveyed, moving to one side of the line so as to follow the pallet in its movement. If all the manual operations are carried out in a correct way and in the time envisaged, when the pallet, proceeding in its continuous movement, exits from the aforesaid assembly station, the part carried by it is provided with all the additional components correctly mounted in the station. If downstream of the assembly station in question at least one further assembly station is provided, a further operator will be assigned to this station for carrying out further assembly operations, and so forth in the case of further stations located downstream of the previous ones.

Once again with reference to FIG. 1, number 7 designates an electronic control system configured for controlling, among other things, motor means (illustrated further in what follows) that govern a continuous movement of the chain conveyor device 3 and of the pallets 5 at a desired and substantially constant rate.

Figure 2A:
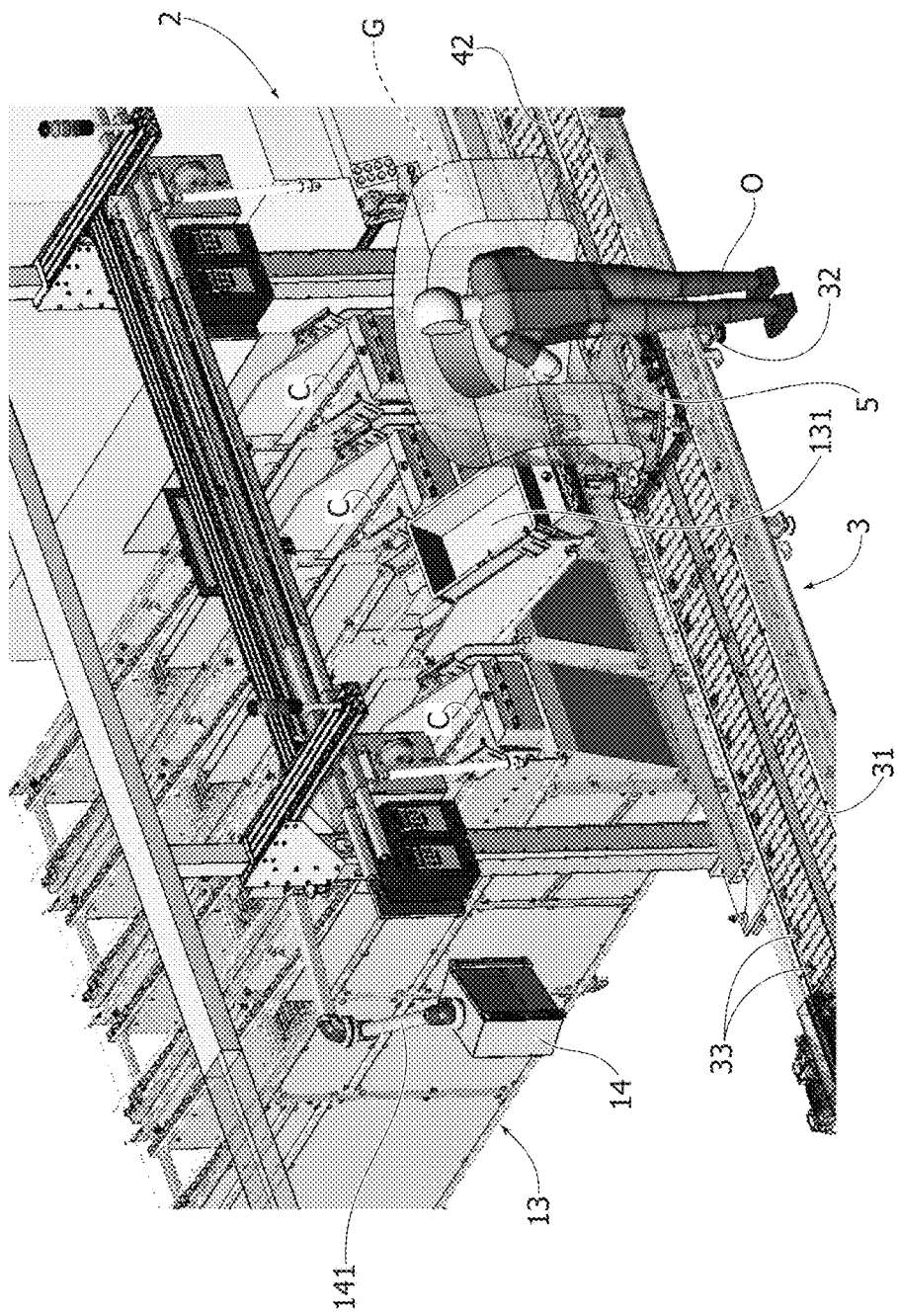
FIGS. 2A-2B are different perspective views at an enlarged scale of an assembly station illustrated in FIG. 1.
Figure 2B:
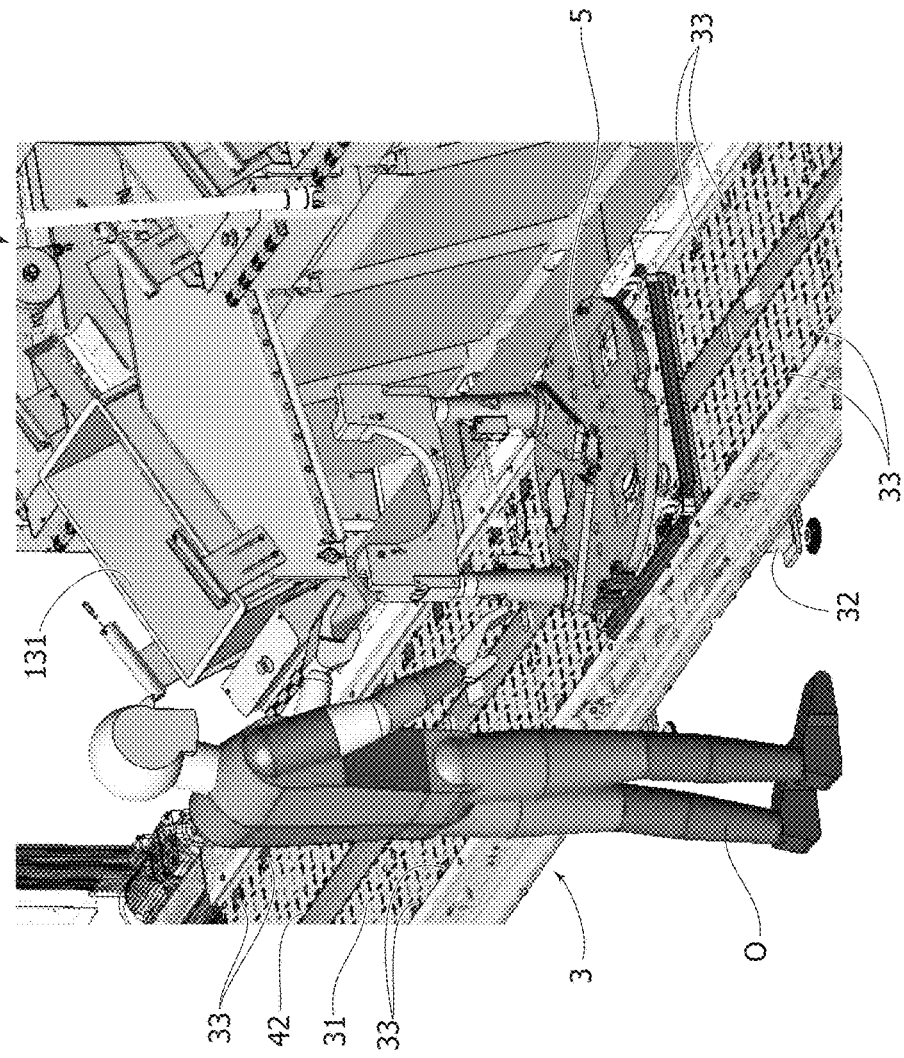

FIGS. 2A and 2B are two detailed perspective views of one of the assembly stations 2 illustrated in FIG. 1. Associated to each assembly station 2 is an automatic system 13 of assistance to the operator O, which comprises a series of automated drawers 131. The automated drawers 131 are prearranged for containing components (e.g., bolts) to be used for assembly of the base parts conveyed by the pallets 5. The drawers 131 are provided in such a way as to be displaceable by means of a mechanised chain-conveyor system C along the automatic assistance system 13 in a direction perpendicular to the chain-conveyor device 3. The drawers 131 can hence be displaced in the aforesaid direction between a retracted position of supply that is set at a distance from the operator O, where the components necessary for assembly can be added in the drawers 131, and an advanced position slightly inclined towards the operator O so as to make it convenient for the latter to reach the drawer 131. Furthermore, the electronic control system 7 is hence programmed to displace in succession the drawers 131 of each automatic assistance system 13 towards the advanced position in synchronism with movement of the pallet 5 on the chain-conveyor device 3. The advanced position of the drawers 131 is inclined in the direction of the operator O so that the operator O does not have to make an excessive effort to reach the parts contained in each drawer 131 and carry out the assembly operations. Designated by the reference G in FIG. 2A is the virtual working area of the operator O that is ergonomic for the operator O himself. The production line 1 enables an increase of the level of productivity also thanks to the fact of guaranteeing for the operators O an operating mode that advantageously does not involve any extensive physical stress.

Once again with reference to FIGS. 2A-2B, moreover illustrated is a portion of the chain-conveyor device 3 that conveys the pallets 5 along the assembly stations 2. The device 3 comprises a supporting frame 32 that rests on the floor, a covering surface 31, and a plurality of freely rotatable rolls 33 prearranged on both sides of the covering surface 31 to serve as a side rest for the pallets 5. The chain-conveyor device 3 further comprises an endless chain 4, which will be illustrated in greater detail hereinafter, that is moved by motor means 6, which will also be described in greater detail in the sequel of the present description, so as to convey the pallets 5 along the chain-conveyor device 3.

Once again with reference to FIG. 2A, the automatic assistance system 13 comprises a human-machine interface 14, preferably of the touch-screen type. The human-machine interface 14 is mounted mobile on a supporting frame 141 in such a way as to be readily accessible by the operator O while the latter follows the pallet, carrying out the assembly operations. In the embodiment illustrated herein, the human-machine interface 14 is configured, for example, in such a way as to:

indicate to the operator O the correct sequence of operations to be carried out on the base parts;

confirming to the operator O the correctness of the individual operations carried out (e.g., the tightening torque of a threaded connection); and receiving an input from the operator O confirming that a single operation has been performed.

Figure 3:
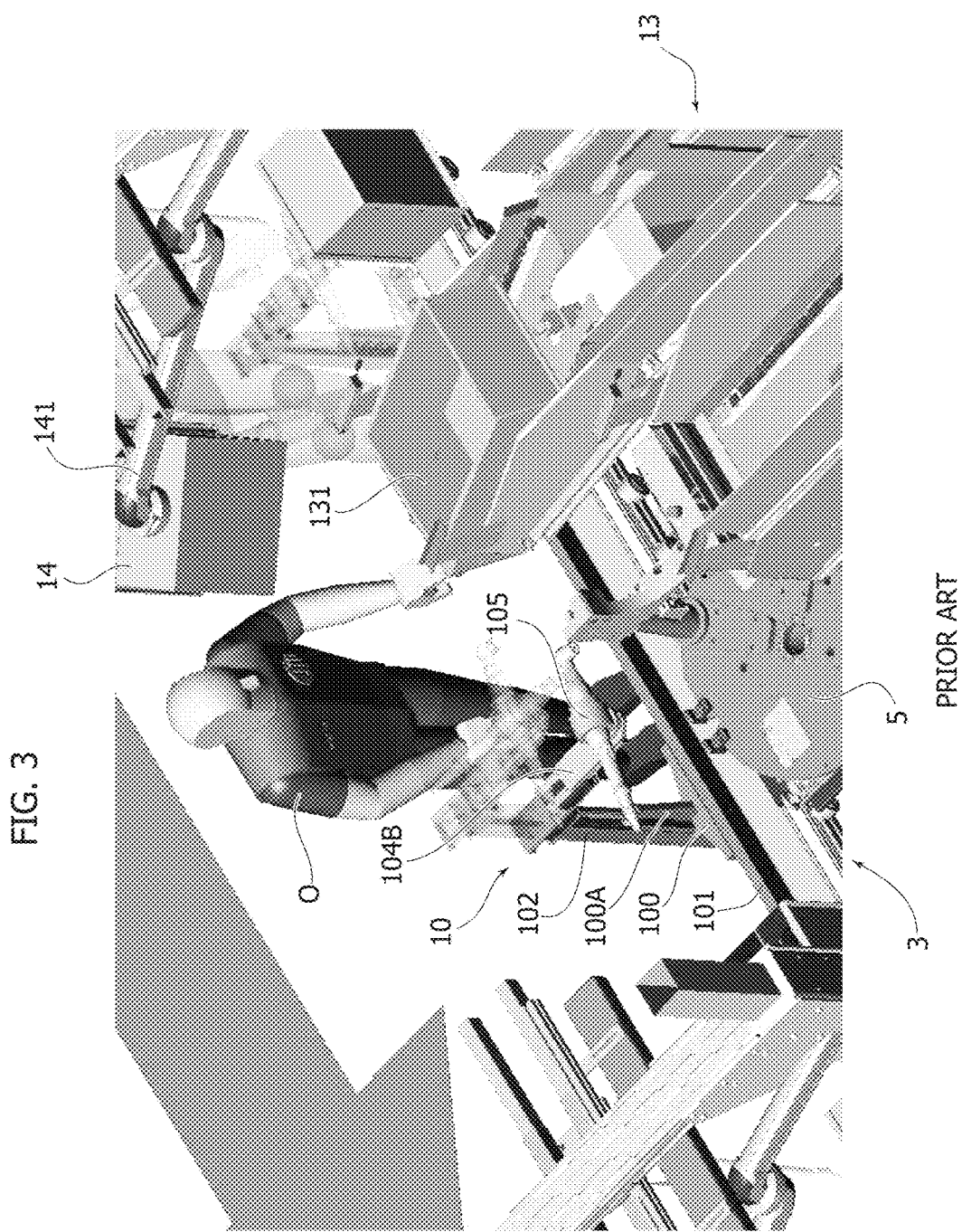

As illustrated in FIG. 3 and more in particular in the examples shown in FIGS. 4A-4C, moreover associated to each assembly station 2 is a tool 10 that is used by the operator O to carry out at least part of the manual assembly operations on the parts conveyed by the pallets 5 (each FIG. 4A-4C showing a single tool 10 in at least two alternate positions).

The tool 10 is carried by a slide 100 that is mounted freely slidable in the direction of conveyance of the pallets 5 on a load-bearing structure 101 mounted adjacent to the chain-conveyor device 3. The structure of the tool 10 is constituted by a succession of elements mounted mobile with respect to one another, according to various degrees of freedom. The last element of the succession has a power wrench 105, which is used by the operator for screwing connection elements such as screws or nuts during the assembly cycle. Of course, the wrench 105 constitutes only one example of a possible tool that can be used. Preferably, moreover, this wrench is removably connected to the structure that supports it so as to be rapidly replaceable with a tool of a different type. Finally, the wrench of course includes a motor-driven spindle that can preferably be coupled to tools of a different type.

In the embodiment illustrated herein, the slide 100 carries a support 100A on which there is mounted, in a vertically adjustable position, a beam element 102 extending in the vertical direction, the top of which supports a plate 104A in a freely slidable way in a horizontal direction orthogonal to the longitudinal direction of the line. In the example illustrated, the plate 104A in turn supports a plate 104B, which is also able to slide freely in the same direction of sliding as the plate 104A. The arrangement described here is modular, in the sense that it is possible to envisage a single slidable plate or else any number of slidable plates cascaded to one another.

To return to the example illustrated, the plate 104B carries the wrench 105 in an orientable way about a vertical axis (see FIG. 4C). By means of the above wrench 105, the operator O can carry out assembly operations on the parts conveyed by the pallets 5, while he moves following the pallet that is moving continuously at a constant speed. While the operator is using the wrench 105, the latter follows in synchronism the operator in his movement in the longitudinal direction of the line, thanks to the slidable support constituted by the slide 100. It is the operator himself who pulls the tool 10 in the aforesaid direction during the assembly operations. The tool 10 moreover renders convenient for the operator positioning of the wrench in the various required positions, thanks to the adjustment in height of the element 102 and to the possibility of sliding of the plates 104A, 104B.

Also thanks to the characteristics of the tool 10 that have been illustrated above, the production line 1 guarantees assembly operations that are convenient and fast in such a way as to render execution thereof efficient.

In the course of normal operation of the line 1, each operator O pushes or pulls the tool 10 along the load-bearing structure 101 adjacent to his own assembly station 2, thus following the pallet 5 conveyed by the chain-conveyor device 3 and operating on the parts conveyed by the pallet 5. At the end of the passage of the pallet 5 along each individual station 2, the operator O pushes the tool in the direction opposite to the previous one, and then repeats the assembly operations on the next pallet 5 that is passing through the station 2.

Each assembly station 2 includes a plurality of data-writing electronic control units (not illustrated herein) prearranged for storing the assembly operations performed on each of the pallets 5. The control units are in communication with the electronic control system 7. Thanks to these characteristics, the production line 1 enables a constant monitoring of the state of assembly of the parts, guaranteeing proper execution of the assembly operations performed.

FIG. 5 illustrates a perspective view of motor means 6 prearranged for moving the chain 4 forming part of the chain-conveyor device 3. In the present embodiment, the motor means 6 comprise an electric motor 61 to which a reducer 62 is associated. The reducer 62 has an output shaft on which a belt 64 is mounted. The electric motor 61 and reducer 62 are carried by the supporting structure 32 fixed to the floor that supports also the chain-conveyor device 3 and the chain 4 itself.

As mentioned previously, the chain-conveyor device 3 includes the chain 4, which is of the endless type and is rotatably mounted around two gears 41, each mounted at the opposite ends of the chain-conveyor device 3. The endless chain 4 has a top, active, chain branch and a bottom, passive, chain branch. The top active chain branch is covered by a series of plates 42 fixed with respect to the chain 4, and said top active chain branch is moved by the motor means 6.

With reference to FIGS. 5-8, the chain 4 is provided with a front series of hook assemblies 8 and a rear series of hook assemblies 9. In particular, with reference to the cross-sectional view of FIG. 7, just one front hook assembly 8 and just one rear hook assembly 9 are set at an adequate distance apart to engage a single pallet 5 conveyed by the chain 4, which, as mentioned previously, is moved by the motor means 6. The hook assemblies 8, 9 and the side rolls 33 (FIG. 2A) hence constitute the elements on which the pallets 5 rest during their movement along the chain-conveyor device 3.

Figure 7:
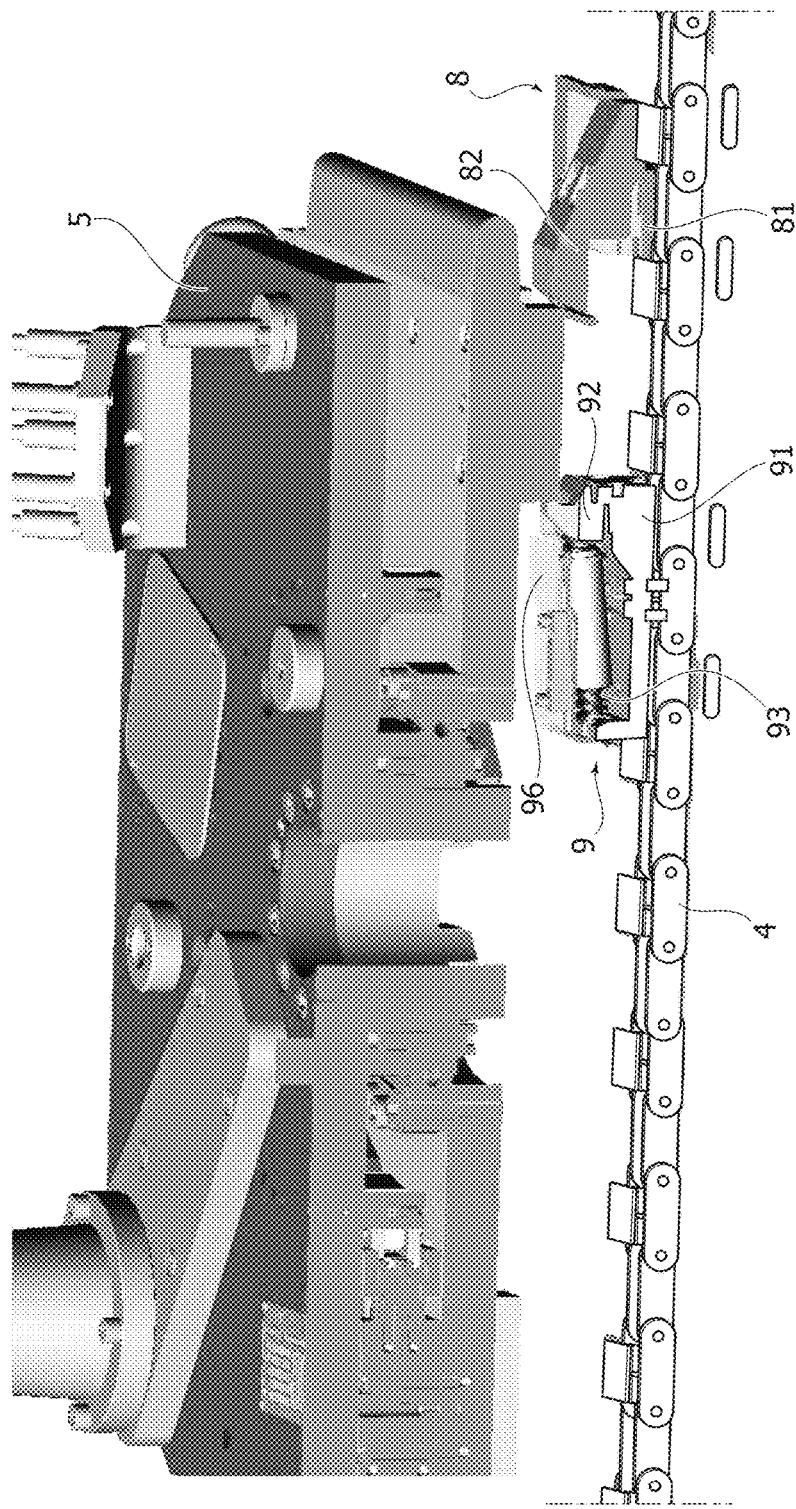

In particular with reference to FIG. 7, each front hook assembly 8 has a supporting bracket 81 rigidly connected to the chain 4 and a hook 82 mounted on the supporting bracket 81. The front hook assemblies 8 are prearranged for serving as a reference for the associated pallets 5.

Also, the rear hook assemblies 9 comprise a supporting bracket 91 rigidly connected to the chain 4 and a hook 92 that is mounted articulated on the supporting bracket 91 around an axis transverse with respect to the longitudinal direction of the chain 4. Each rear hook assembly 9 further comprises a spring 93 that recalls the hook 92 towards a position of engagement of the respective pallet 5 (illustrated in FIG. 6A). The rear hook assembly 9 moreover has a cover 96 (FIG. 8) prearranged for covering the spring 93. The rear hook assemblies 9 are prearranged for pushing the pallets 5 along the chain 4 of the conveyor device 3.

Illustrated in FIG. 7 is the operating configuration of the hook assemblies 8, 9 such that the single pallets 5 is carried by these assemblies 8, 9.

Figure 6B:
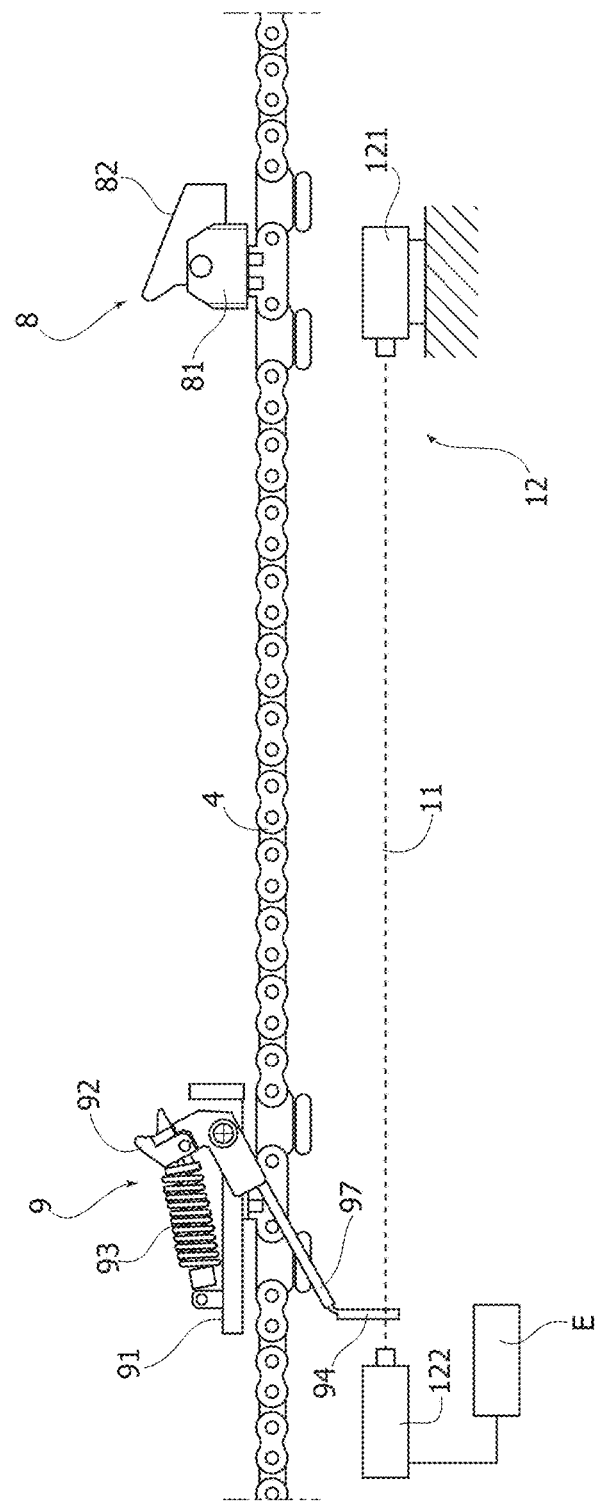
Figure 6C:
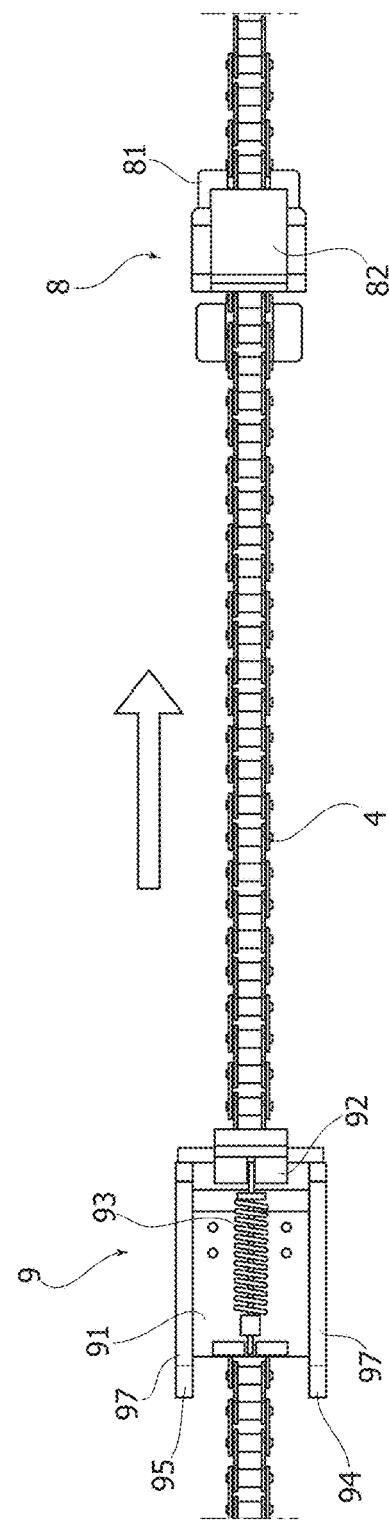
FIG. 6C is a top view of the same details illustrated in FIGS. 6A-6B.
Figure 8:
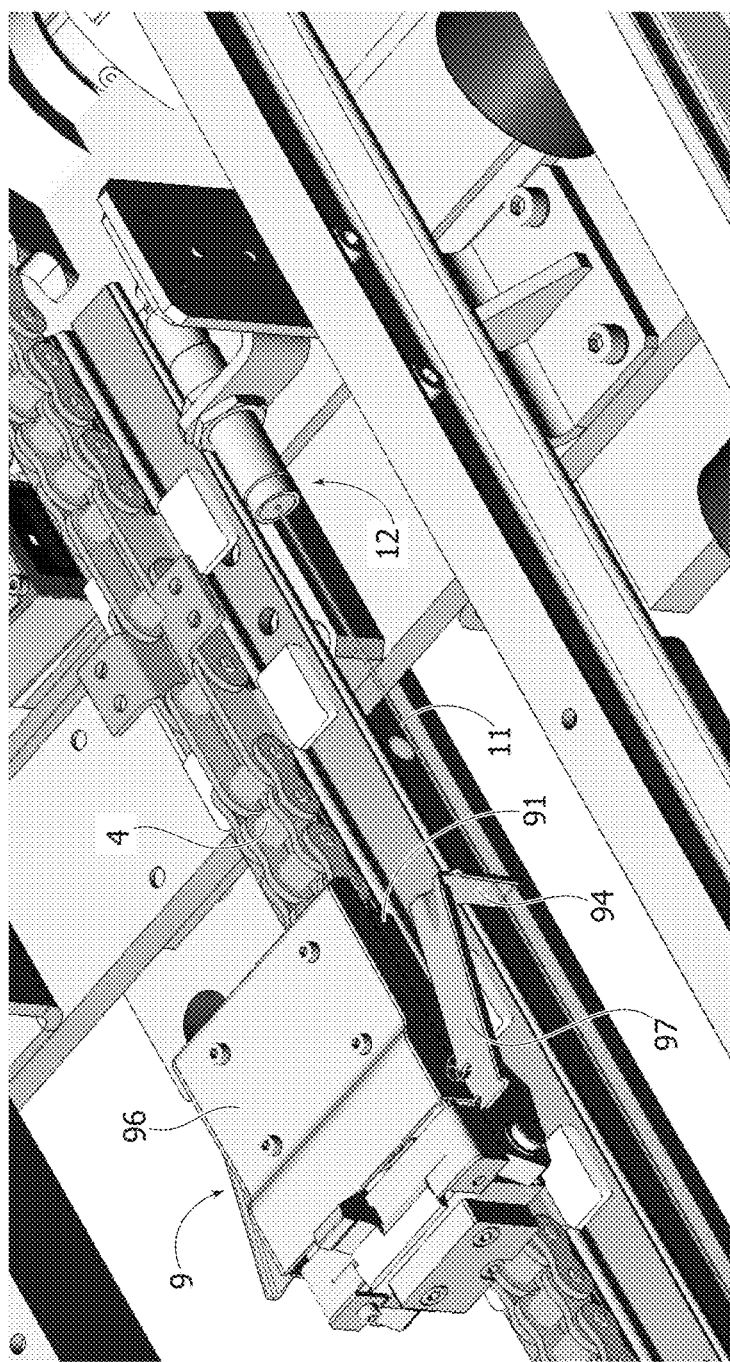
Figure 9:
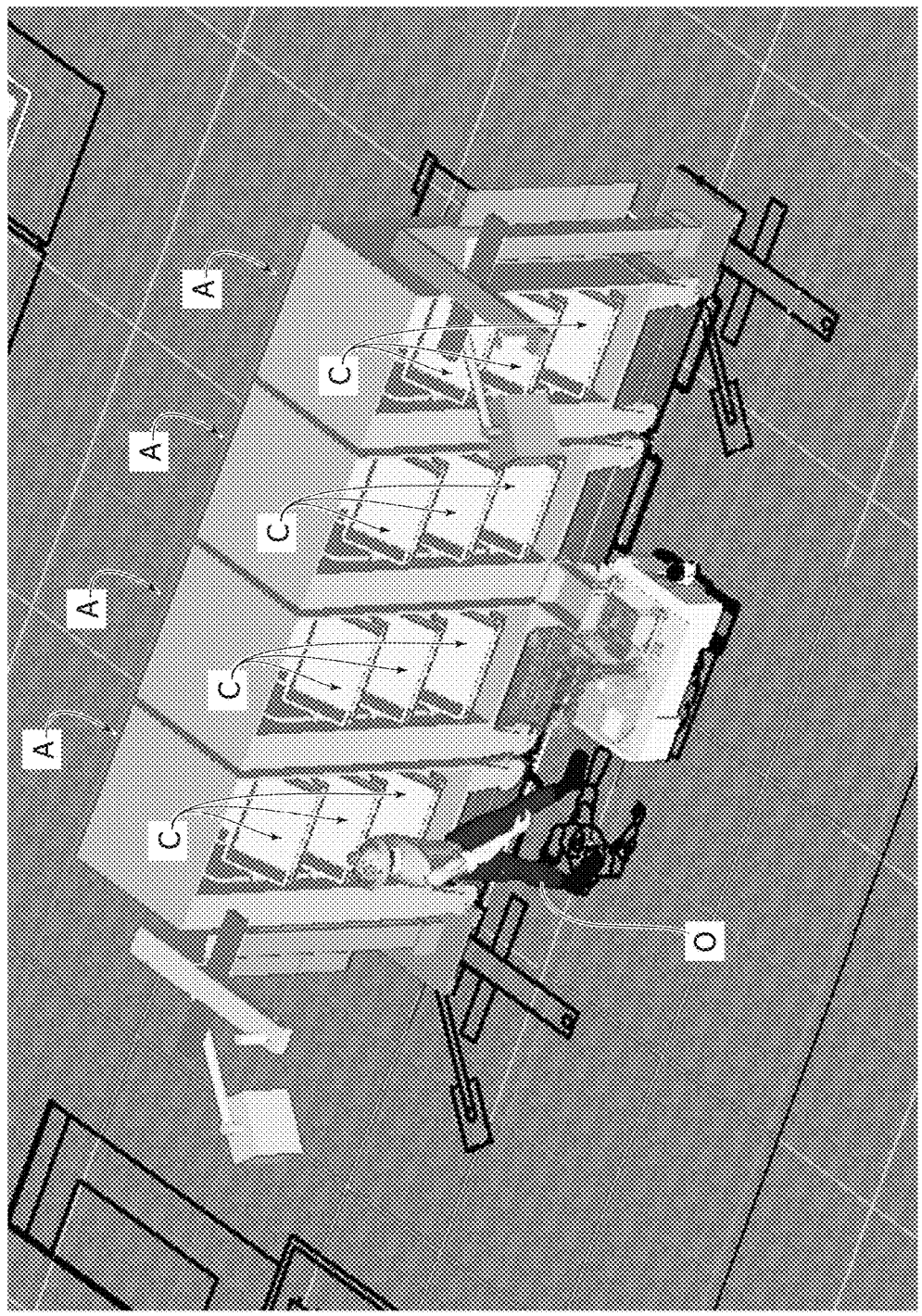
FIG. 9 is a perspective view that illustrates a plurality of modules for carrying containers according to the present invention, in the form of cabinets with automated drawers associated to an assembly station of a production line.

As illustrated in FIGS. 6B and 8, each rear hook assembly 9 moreover has a first interception element 94 and a second interception element 95. The interception elements 94 and 95 are rectangular plates each carried by a respective arm 97 connected to the support bracket 91 of the rear hook assembly 9. The interception elements 94 and 95 are positioned on two opposite sides of the hook support bracket 91 and have their main surfaces oriented vertically and situated on the two respective outer sides of the chain 4.

Of course, the specific structure of the front and rear hook assemblies 8, 9 that has been described above is here provided purely by way of example.

The chain-conveyor device 3, as illustrated in FIGS. 6B and 8 further comprises a first optical sensor 12 and a second optical sensor (not illustrated in the drawings). The sensor 12 is constituted by an emitter 121 that emits an optical beam 11 and by a receiver 122 designed to receive the optical beam emitted by the emitter. Also, the second sensor is constituted by an emitter and by a receiver.

Both of the sensors are in communication with an electronic control unit E that is connected to, or incorporated in, the electronic control system 7 of the line 1.

With reference, in particular, to FIGS. 6B and 8, illustrated therein is an operating configuration of the rear hook assemblies 9 that occurs following upon a fault of operation in the course of assembly of the parts conveyed by the pallets 5. In particular, in the case where an obstacle prevents one of the pallets 5 from advancing together with the chain 4, the hook assembly 9 that pushes the pallet 5 encounters a resisting force that prevents its advance. Consequently, in this condition, the hook 92 moves away from the position of engagement of the respective pallet 5 against the action of the spring 93, which tends, instead, to keep the hook 92 engaged on the respective pallet 5. The hook 92, which has been rotated following upon the presence of the obstacle that prevents advance of the pallet 5, reaches a position of optical-beam interception, illustrated in FIGS. 6B and 8. In the position of interception, the first interception element 94 intercepts the first optical beam 11 emitted by the emitter 121 of the first optical sensor 12. Once again in this position of optical-beam interception, it moreover happens that the second interception element 95 of the hook 92 intercepts a second optical beam emitted by the emitter of the second optical sensor (not illustrated herein).

The electronic control system 7 of the line 1 is programmed for generating a control signal when the first optical beam 11 of the first optical sensor 12 is intercepted by the first interception element 94 of one of the rear hook assemblies 9. This control signal can generate a visual and/or acoustic alarm warning, but more preferably also causes arrest of the chain-conveyor device 3 or else can generate merely arrest or cessation of further movement.

Thanks to this characteristic, the production line guarantees safety for the operators who are to interact with the production line. Furthermore, when the optical beam emitted by the second optical sensor intercepts the second interception element 95, the electronic control unit E of the line 1 is programmed for emitting a signal that is used by the electronic control system 7 for identifying the hook 92 that has moved away from its position of engagement. The electronic system 7 is thus configured for identifying on which of the pallets 5 there has occurred the fault of operation determined by the presence of the obstacle on the chain 4 that has prevented conveyance of the specific pallet 5.

The electronic control system 7 of the line 1 further comprises an encoder (not illustrated) prearranged for controlling the position of the chain 4, and hence of the pallet 5 that is passing through the assembly station, and a second encoder (not illustrated) prearranged for controlling the position of each tool 10 along the load-bearing structure 101.

Thanks to the aforesaid characteristics, the production line 1 with continuous movement of the pallets 5 guarantees that the assembly operations are convenient and fast and at the same time makes it possible to check that each cycle of assembly operations has gone through correctly and to intervene promptly in the case of any fault, in particular in the case of an impediment or obstacle to the movement of the pallets.

Furthermore, the production line 1 guarantees a high level of ergonomics for the operators O and enables assembly of parts of different dimensions, carrying out a continuous monitoring of the state of assembly and hence of the level of production of the line 1.

The number of the assembly stations 2 of the line 1 can be modified according to the production requirement and to the parts to be assembled conveyed by the pallets 5. Also thanks to this characteristic, the production line can be easily integrated in various parts of the layout of a production environment.

Description of the Example Module for Carrying Containers

The description presented above regarding the annexed FIGS. 1-8 regards, as already mentioned, a production line according to the embodiment already illustrated in the prior patent application No. European EP 1 616 8061.6 filed in the name of the present applicant.

The present invention regards a new embodiment of the aforesaid production line in which, as an alternative or in addition to the assistance system 13 with automated drawers 130, one or more modules for carrying containers are used in the form of cabinets with automated drawers of the type described hereinafter.

In FIGS. 9-21 designated as a whole by the reference A is a cabinet with automated drawers according to the present invention comprising a plurality of automated drawers C.

Figure 10:
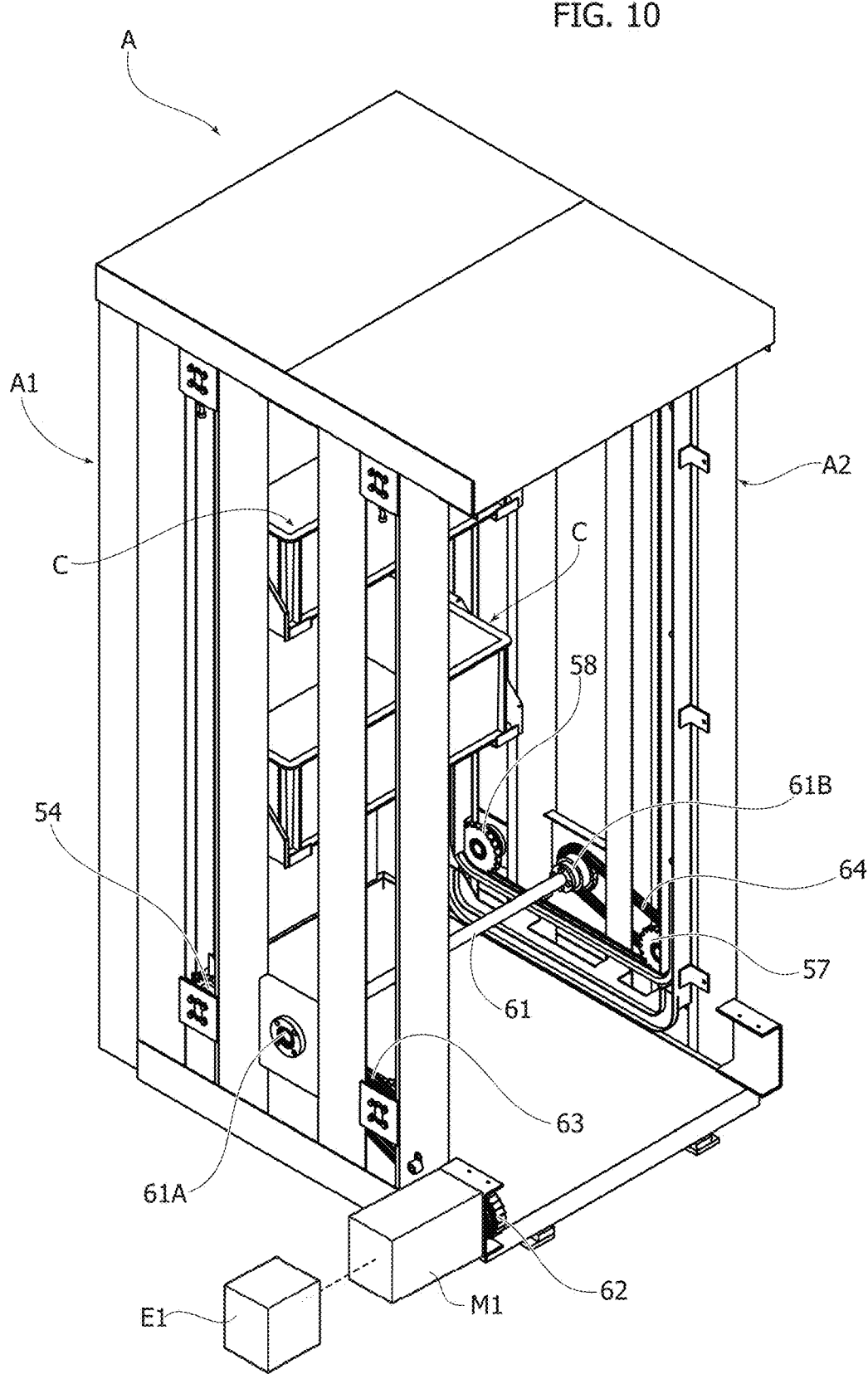
FIGS. 10 and 11 are a perspective view and a front view, respectively, of the cabinet with automated drawers of the FIG. 9.
Figure 11:
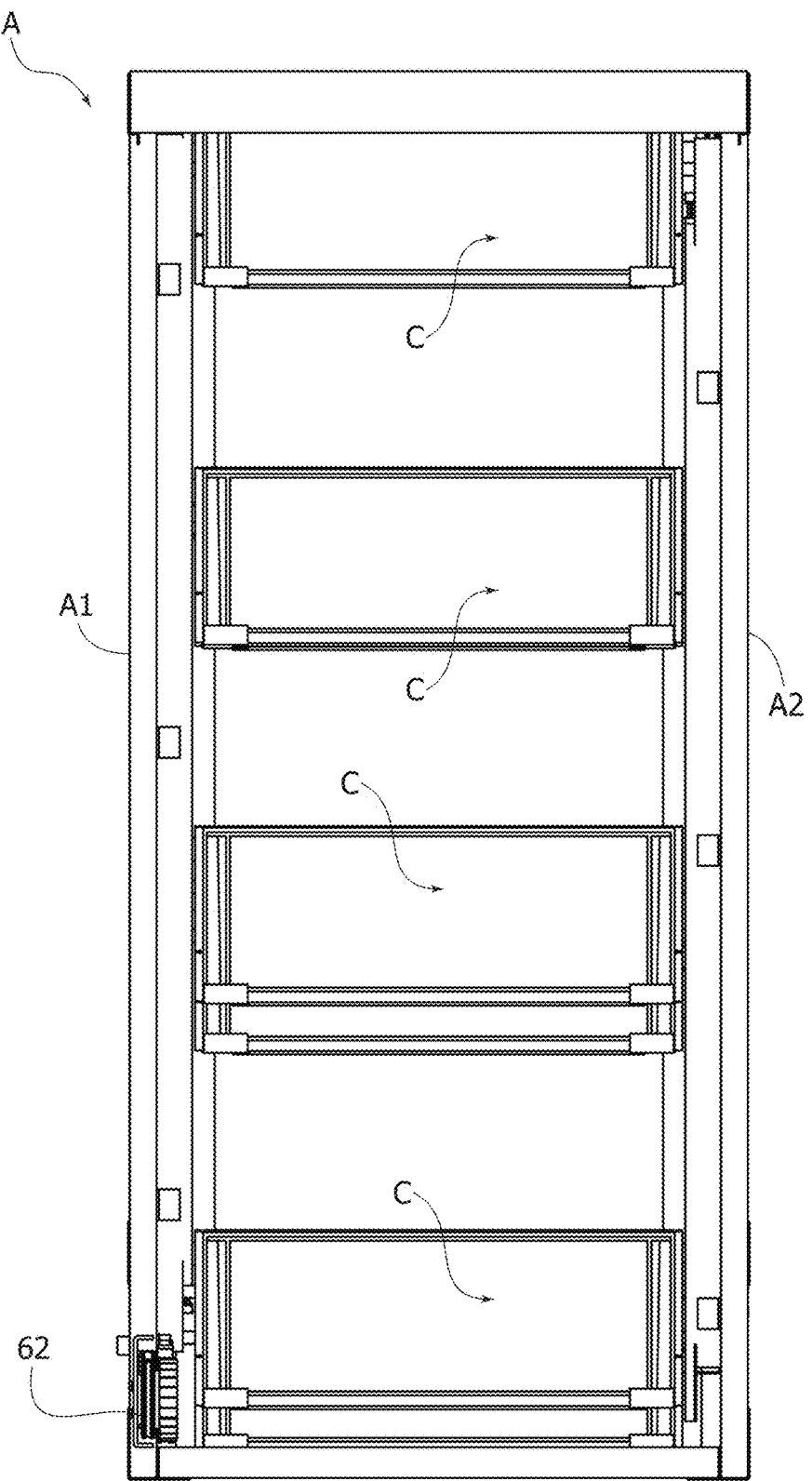

The cabinet A comprises a load-bearing parallelepipedal structure with a bottom wall, a top wall, and two side walls A1, A2. As illustrated in FIGS. 9, 10, 11, and 21, the load-bearing structure of the cabinet A does not have any front wall so as to enable convenient access for the operator O to the contents of the automated drawers C carried by the cabinet A. In order to have a light load-bearing structure, the side walls A1, A2 of the load-bearing structure of the cabinet A may also be provided with a configuration of the lattice type (FIG. 10).

According to a fundamental characteristic of the invention, in order to render the movement of the drawers C carried by the cabinet A automated, the plurality of drawers C is associated to a paternoster conveyor system that includes a chain-transmission system. As best seen in FIGS. 16-20, the chain-transmission system comprises two lateral endless chains 51, 52 each mounted adjacent to one of the side walls A1, A2 of the load-bearing structure of the cabinet A, in such a way that the sides of the drawers C are connected to the two lateral chains 51, 52. The drawers C are arranged according to a fixed pitch along the endless-loop path defined by the two lateral chains 51, 52. Each of the two lateral chains 51, 52 has a respective front vertical branch 51A, 52A, a respective rear vertical branch 51B, 52B, a respective top horizontal branch 51C, 52C, and a respective bottom horizontal branch 51D, 52D.

Figure 16:
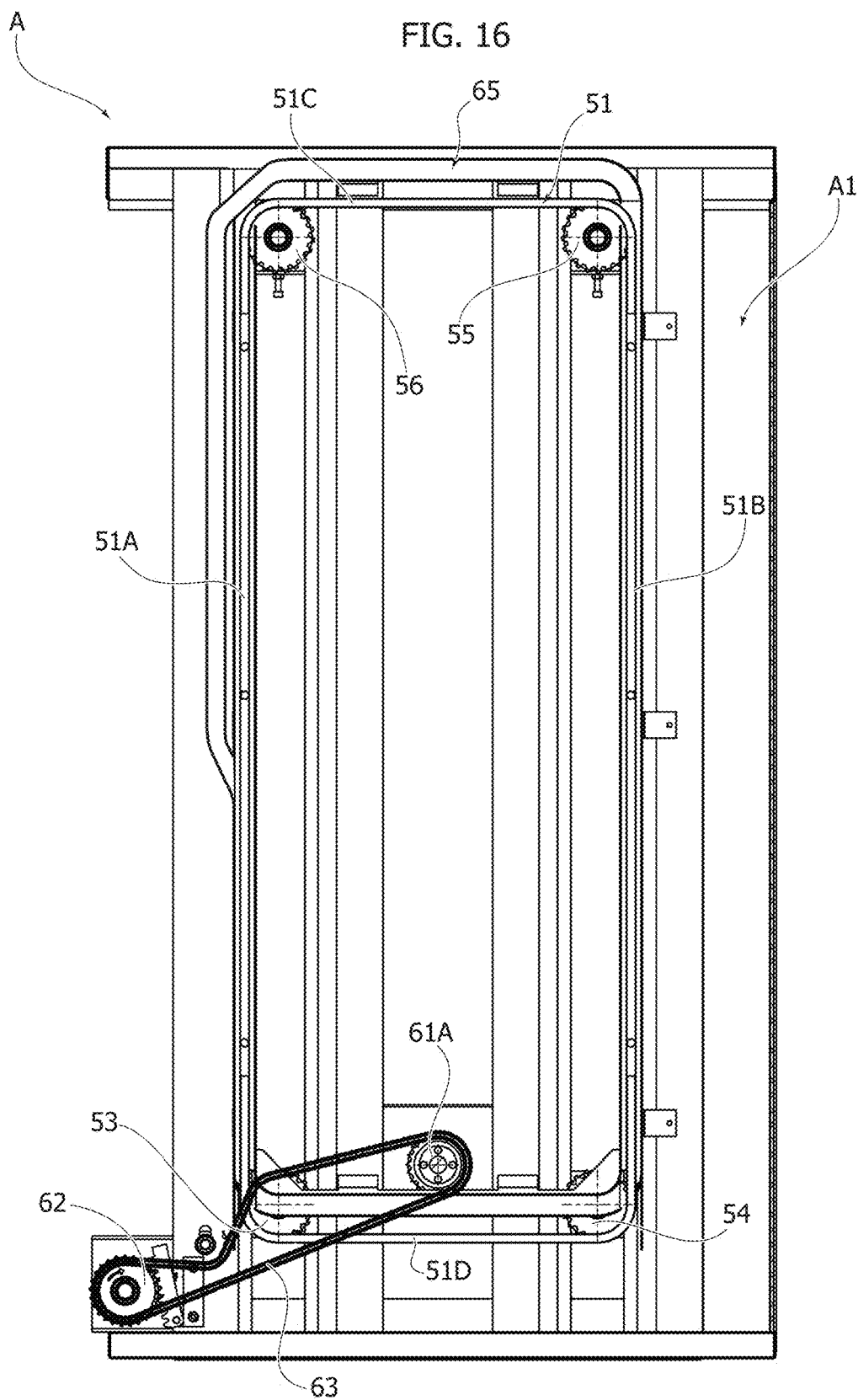
FIGS. 16 and 17 are each a respective cross-sectional right and left side view of the cabinet in FIG. 10 shown without automated drawers.
Figure 17:
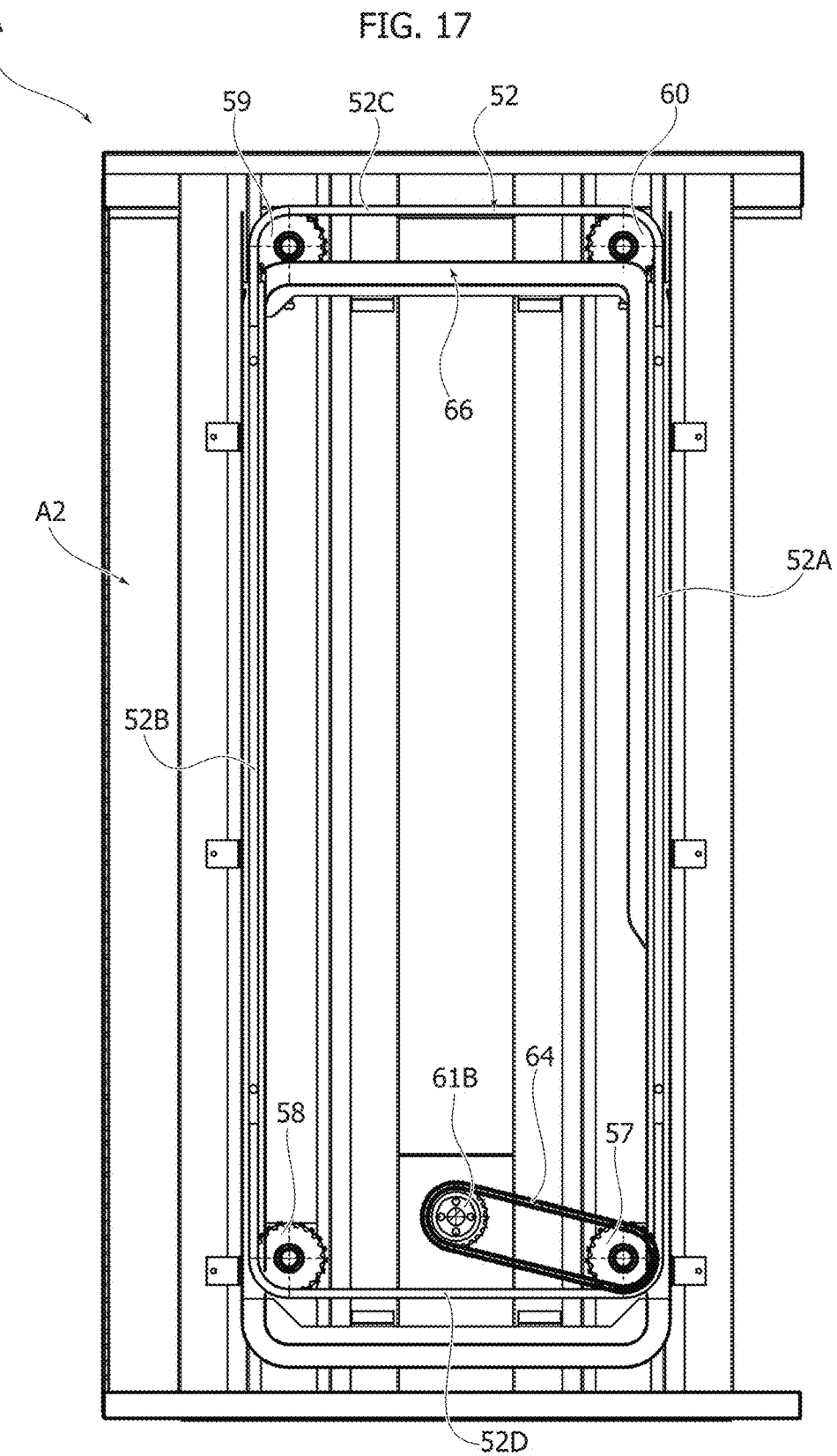
Figure 18:
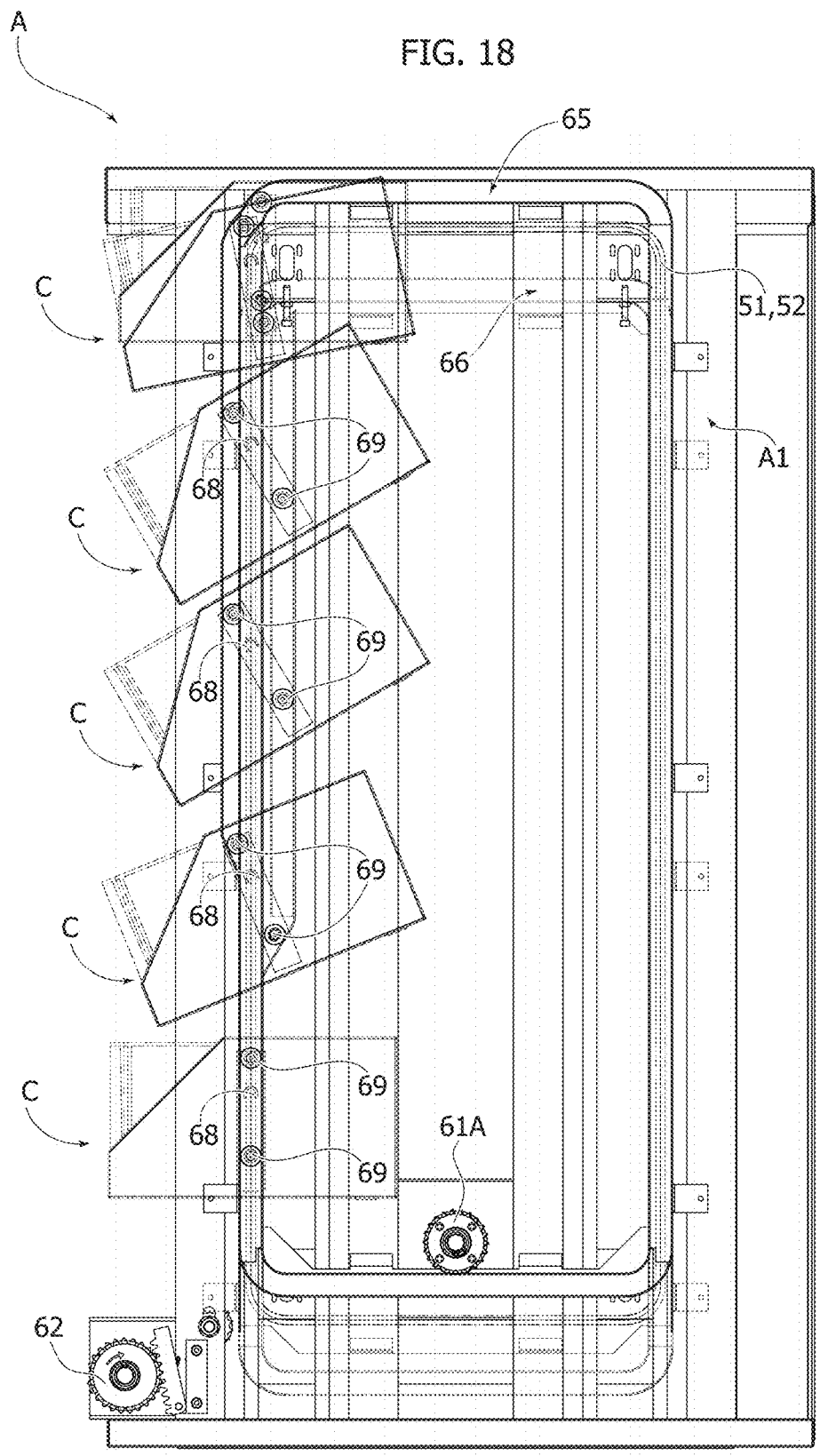
FIG. 18 shows the cabinet with drawers viewed from the side illustrated in FIG. 16, with some drawers engaged in the respective guides and chains.

With reference in particular to the perspective view of FIG. 10 and to the side views of FIGS. 16 and 17, which illustrate a preferred embodiment of the cabinet A according to the present invention, each lateral endless chain 51, 52, is engaged on four respective chain wheels (53, 54, 55, 56, 57, 58, 59, 60) rotatably mounted on the load-bearing structure of the cabinet A. The chain wheels are connected to a driving motor M1 which is in communication with and controlled by an electronic control unit E1. The driving motor M1 transmits the motion to a first chain wheel 53 of a first lateral chain 51, and a transmission shaft 61 mounted in the proximity of the bottom wall of the load-bearing structure of the cabinet A transmits the motion from the chain wheel 53 of the first lateral chain 51 to a chain wheel 57 of the second lateral chain 52. More in particular, as illustrated in FIGS. 10, 16, and 18, the driving motor M1 actuates an end gear 62, and via a transmission belt 63 the motion is transmitted to the first chain wheel 53. Once again via the belt 63 (FIGS. 10 and 16), the motion is transmitted also to a first end 61A of the transmission shaft 61. The motion is then transmitted to the opposite end 61B of the shaft 61, which is connected, with a transmission belt 64, to the chain wheel 57 of the second lateral chain 52 (FIG. 17).

Thanks to the structure described above, during an operating step of a working cycle, the drawers C move in an automated way thanks to the movement of the chains 51, 52 imparted by the drive motor M1. The aforesaid driving motor M1 is controlled by an electronic control unit E1 according to a predetermined program, on the basis of control signals including at least one safety arrest signal and one signal indicating the position of each drawer C along the endless-loop path.

As mentioned previously, mounted with a fixed pitch along the endless-loop path defined by the two lateral chains 51, 52 are a plurality of drawers C. According to a further important characteristic of the present invention, the load-bearing structure of the cabinet A is provided, on its side walls, not only with the two chains 51, 52 but also with two lateral guide rails 65, 66 that are to be engaged by the side walls of the drawers C. Each guide rail 65, 66 is configured according to an endless loop and is mounted in the proximity of a respective lateral chain 51, 52.

As illustrated in particular in the side views of the cabinet A of FIGS. 16 and 17, the two lateral guide rails 65, 66 are not prearranged in the same way on the respective side wall of the cabinet A, but are instead configured in a way different from one another. This configuration is defined in such a way that the drawers C maintain a horizontal orientation along the endless-loop path defined by the two lateral chains 51, 52, except for a portion of the step of descent along the front vertical branches 51A, 52A of the two chains 51, 52. In this portion, the drawers C are brought to tilt forwards and downwards, to favour access to each drawer C by the operator O (FIG. 18). The configuration of the two guides 65, 66, as mentioned above, is described more fully in the sequel of the present description.

Figure 12:
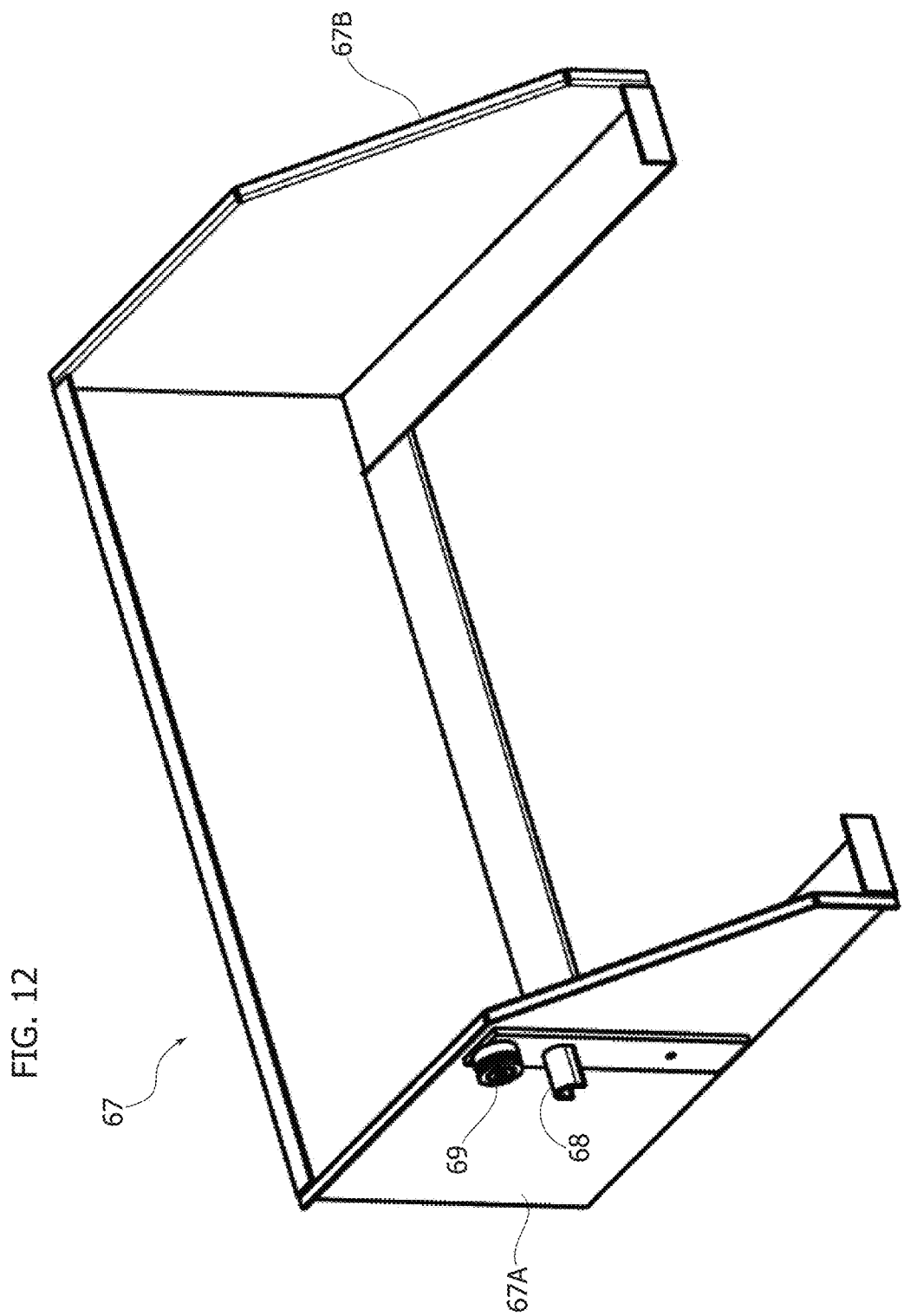
FIGS. 12-14 are perspective views of different embodiments of automated drawers.
Figure 13:
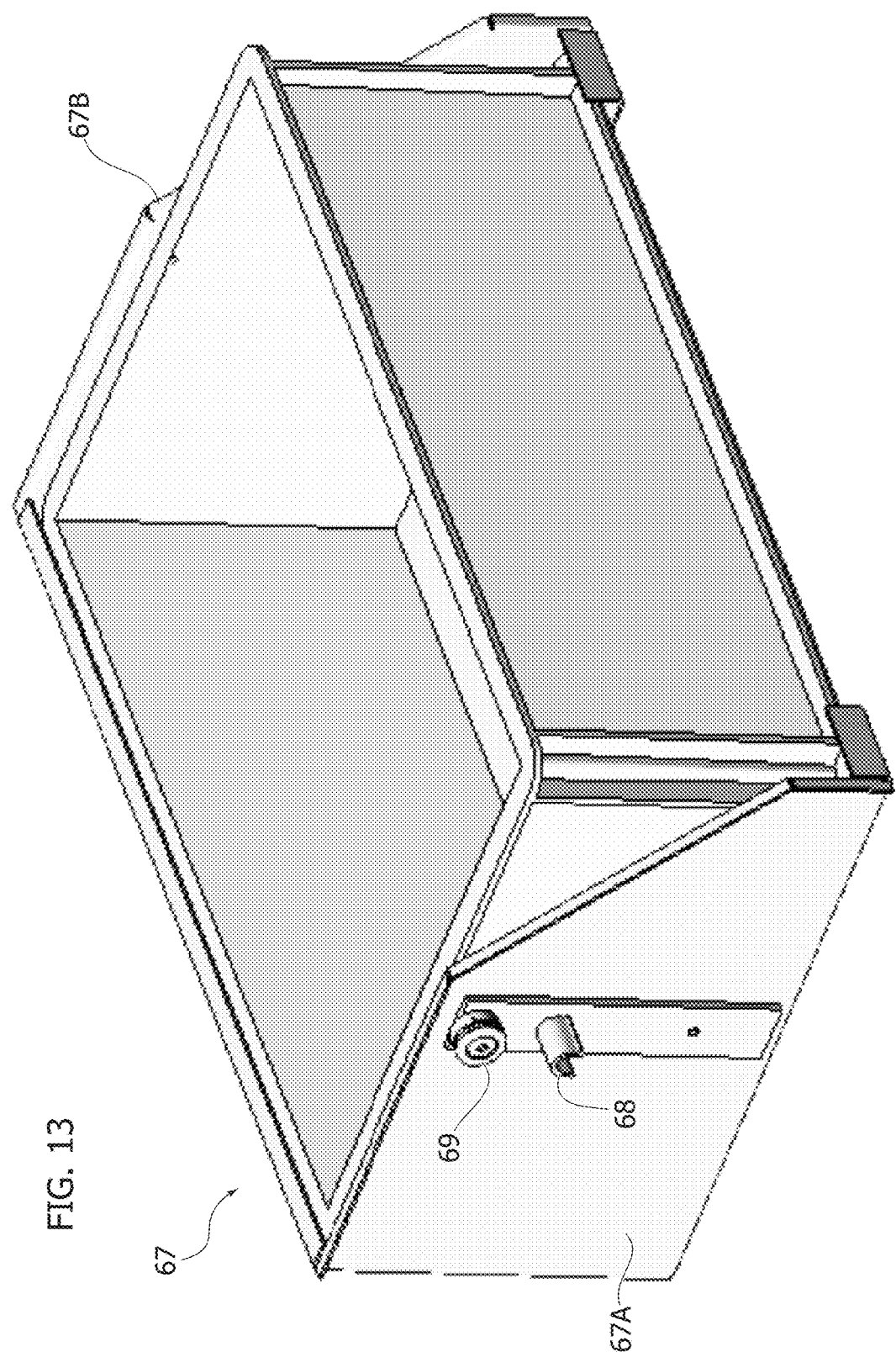
Figure 14:
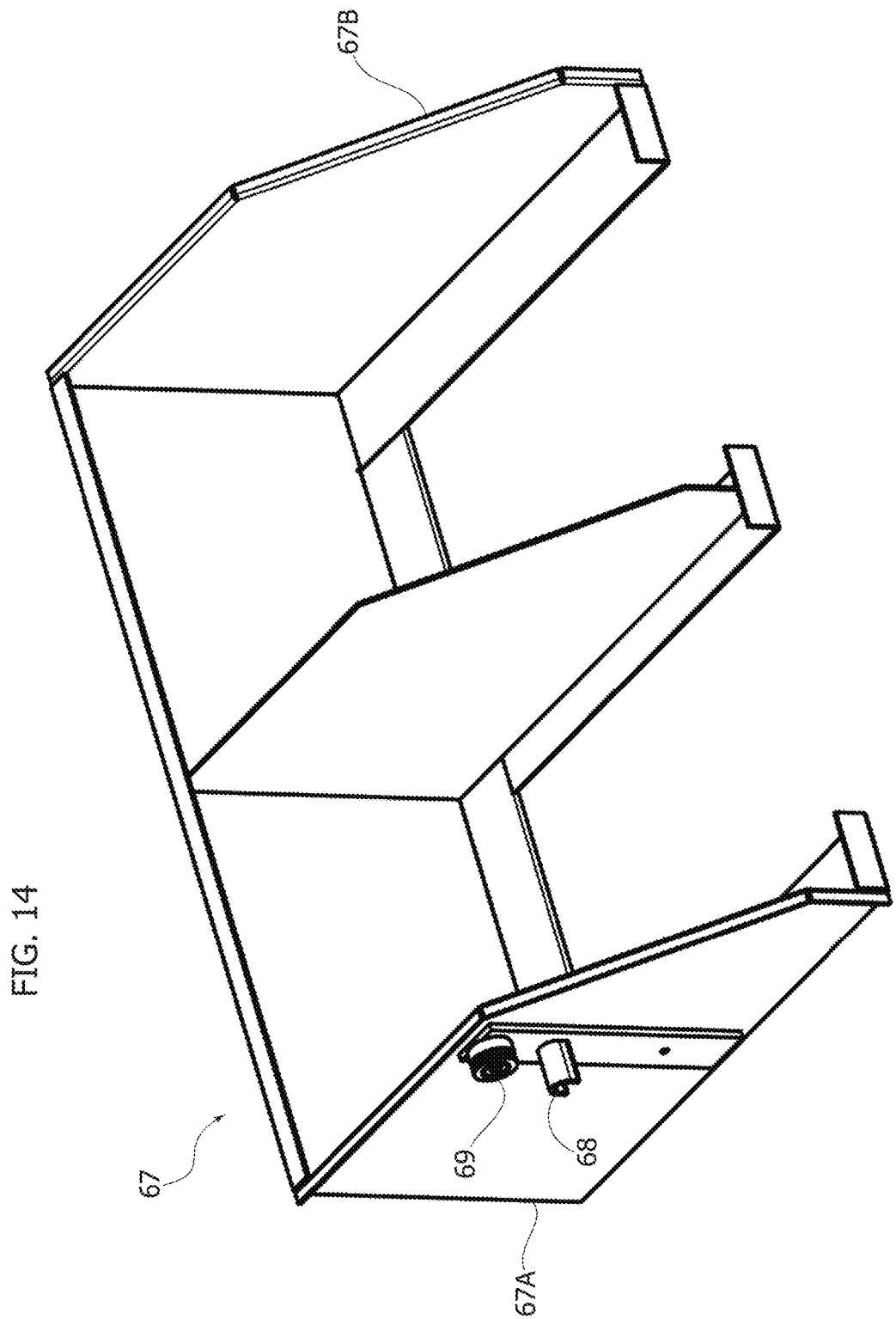
Figure 15:
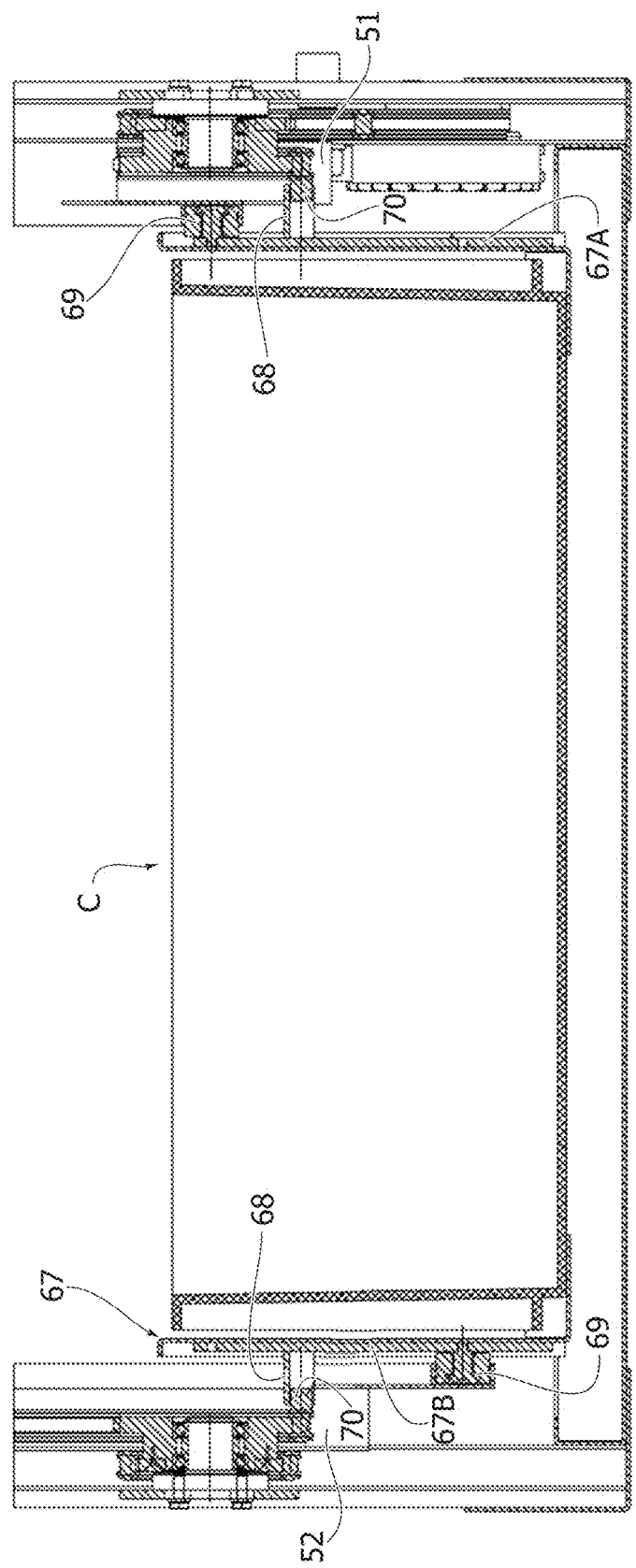
FIG. 15 is a cross-sectional view of an example drawer engaged in the cabinet with drawers.

With reference to FIGS. 12-14, the configuration of the drawers C is now described in detail. In a preferred embodiment (FIGS. 12 and 13), each drawer C comprises a drawer-carrying structure 67 with open bottom, carried on which is a container that is to contain various objects used by the operator O during a working cycle. The drawer-carrying structure 67 may also be prearranged, adapted or operable for receiving two containers set alongside one another (FIG. 14). Thanks to the configurations of the drawers C described above, the modalities of supply of parts within the drawers C are extremely simple since it is not necessary to slide the entire drawer C out of the paternoster system of the cabinet A to add or remove parts.

Once again with reference to FIGS. 12-14, each of the drawers C has two opposite side walls 67A, 67B, rigidly mounted on which is a first engagement element 68 rotatably mounted on a wheel 69. The first engagement element 68 is prearranged, adapted or operable for being engaged on a second engagement element 70 (FIG. 15) carried by a respective lateral chain 51, 52 in such a way that each drawer C is carried and moved by the chain-transmission system when the driving motor is activated. In this way, as will be described more fully in what follows, there are envisaged a step of ascent along the rear vertical branch 51B, 52B of the chains 51, 52 and a step of descent along the front vertical branch 51A, 52A of the two chains 51, 52.

Figure 19:
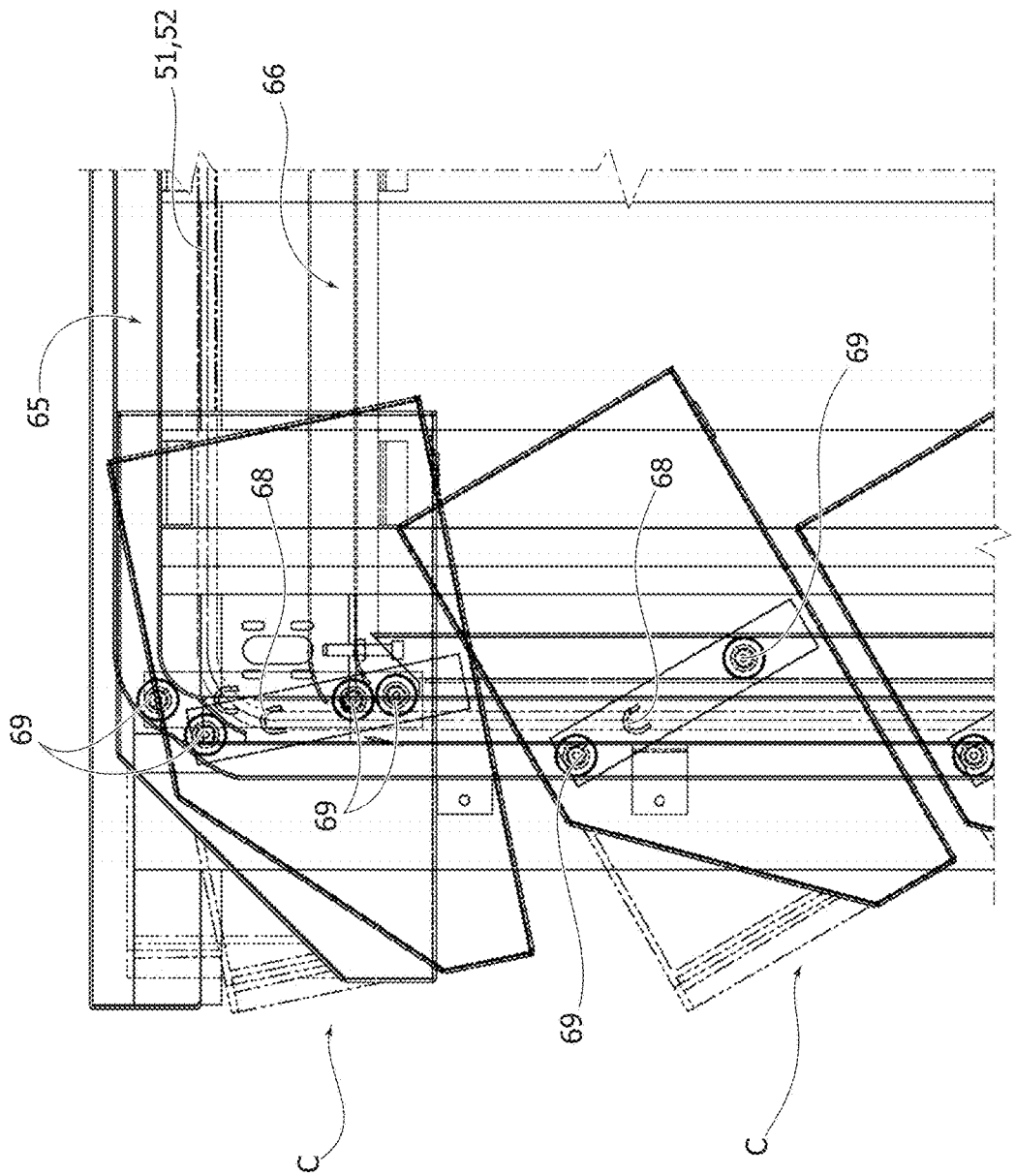
FIGS. 19 and 20 are alternate side views at an enlarged scale of some details illustrated in FIG. 18.
Figure 20:
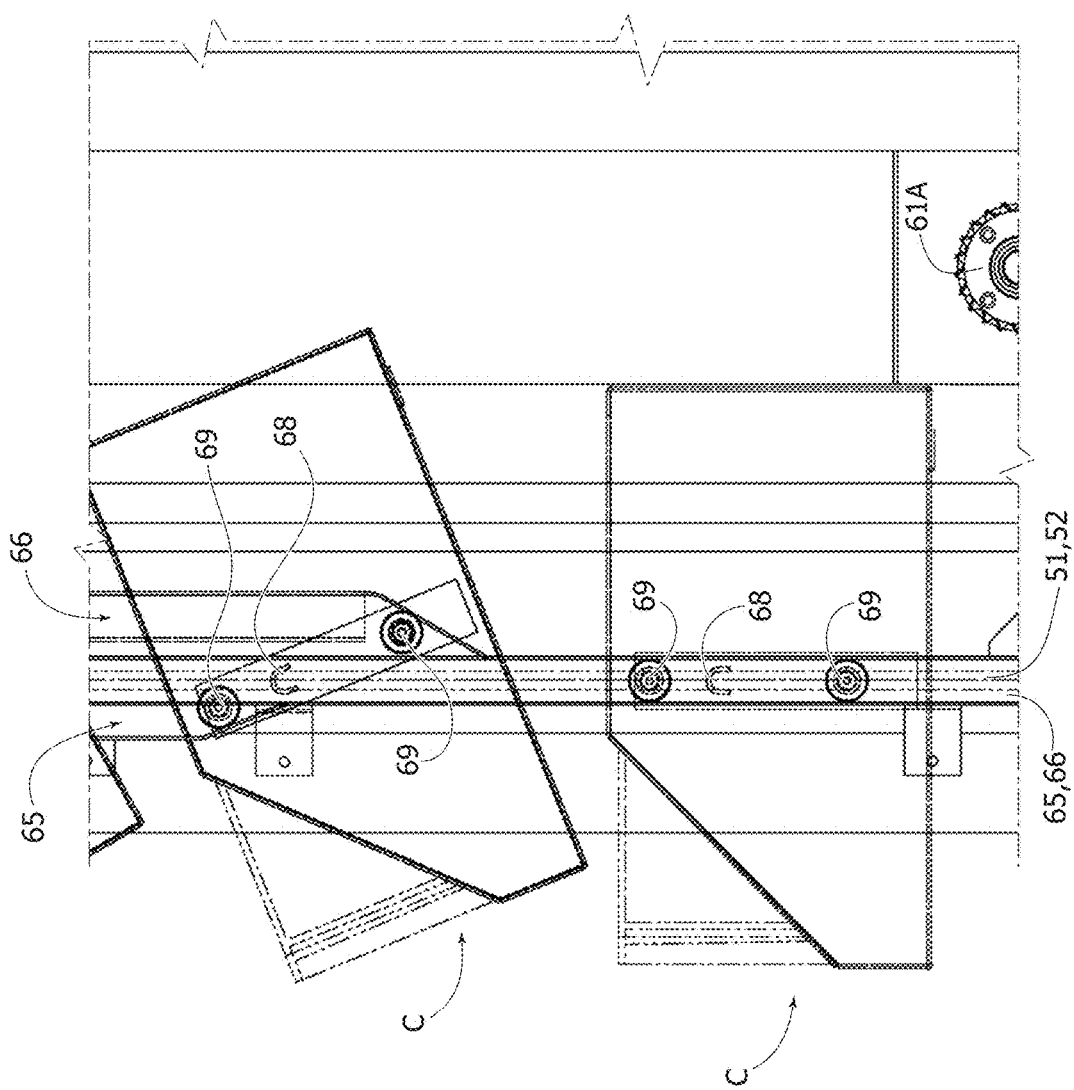

In the preferred embodiment illustrated in the drawings, the first engagement element 68 is a tile with semi-circular profile having a radius of curvature sized to enable the drawer to remain engaged on the second engagement element 70 carried by the respective chain 51, 52 also in the step of descent where the drawer is inclined towards the operator O (see FIGS. 18-20).

Each of the aforesaid wheels 69 prearranged, adapted or operable on the side walls 67A, 67B of each drawer C is engaged in a respective lateral guide rail 65, 66. As illustrated in the cross-sectional view of FIG. 15, the wheels 69 are provided on each of the two sides of the drawer C in positions that are not symmetrical with respect to one another so as to enable engagement in the respective guide rail 65, 66 provided on the side walls A1, A2 of the cabinet A.

As mentioned previously, the two guide rails 65, 66 each provided on the respective side wall A1, A2 are configured in a way different from one another. With reference to the side view of FIG. 18 of the cabinet A, illustrated in which is the step of descent of the drawers C, the guide rail 65 is provided on the respective side wall of the cabinet A at a height greater than that of the guide rail 66 provided on the lateral wall A2. Furthermore, once again with reference to FIG. 18 and to the side views of the cabinet A of FIGS. 16 and 17, in the portion of descent of the drawers C along the front vertical branches 51A, 52A of the chains 51, 52, the guide rail 66 has a portion of front vertical branch set facing the inside of the cabinet A, thus defining a substantially S-shaped path along which one of the two wheels 69 of the drawers C runs, while the guide 65 also has a portion of front vertical branch prearranged for defining a substantially S-shaped path in such a way that the final stretches of the two front vertical branches of the guides 65, 66 are aligned respectively to the chains 51, 52. As already mentioned previously, thanks to this configuration of the two guides rails 65, 66, the drawers C tilt during the step of descent as illustrated in FIGS. 18-20, enabling convenient access for the operator O to the contents of the drawers C.

Preferably, in order to enable traceability of the contents of the drawers C, each drawer C is prearranged to have within it a microchip (not illustrated in the drawings) connected to the aforesaid electronic control unit, for reading and/or writing information regarding movement of objects contained in the drawers C.

In the sequel of the present description, operation of the cabinet with automated drawers A according to the present invention will now be described. Thanks to the structure described above, via activation of the aforesaid driving motor, a movement of the paternoster system is obtained, including the chain-transmission system that moves the drawers C that are arranged with a fixed pitch in the cabinet A along the endless-loop path defined by the two lateral chains 51, 52.

As best seen in FIGS. 10, 16 and 17, the driving motor M1 ultimately provides a driving motion to the first chain wheel 53, which in turn moves the first lateral chain 51. The transmission shaft 61 mounted in the proximity of the bottom wall of the cabinet A transmits the motion to a second chain wheel 57, which in turn moves the second lateral chain 52. The drawers hence move with a continuous movement that envisages a step of ascent along the rear vertical branches 51B, 52B of the two chains 51, 52 and a step of descent along the front vertical branches 51A, 52A facing the operator O. Thanks to the configuration of the two guide rails 65, 66 in which the wheels 69 are engaged, in the step of descent along the front vertical branches 51A, 52A of the two chains 51, 52, the drawers C tilt in the direction of the operator O who is assigned to a given assembly station 2 of the production line 1 (FIGS. 18-21), thus enabling the operator O to access conveniently the contents of the drawers.

The working cycle programmed by the aforesaid electronic control unit may envisage that the drawers set themselves in predefined positions along the endless-loop path, or else may envisage that the operator O activates manually movement of the drawers C along the endless-loop path.

Figure 21:
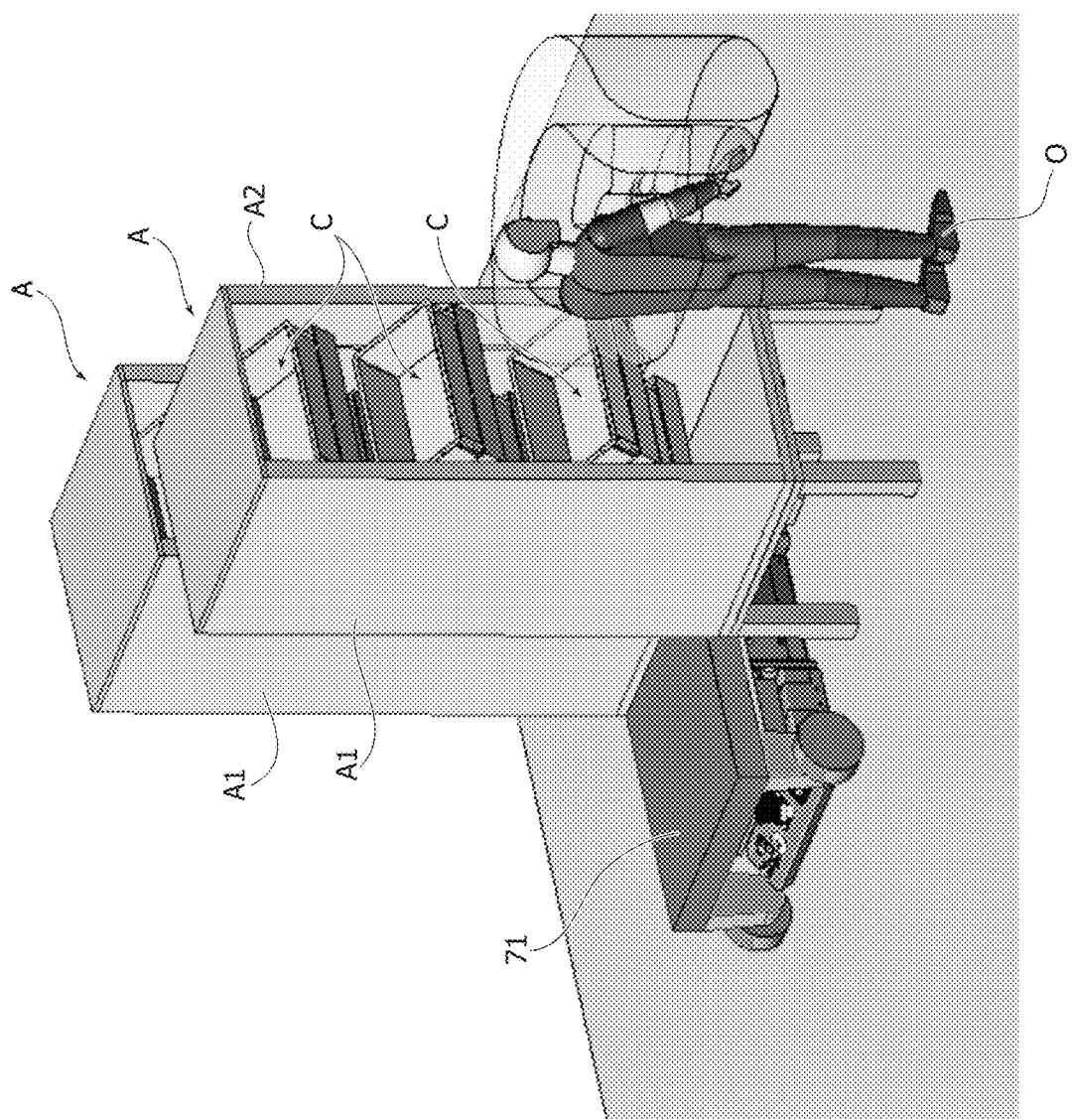
FIG. 21 is a perspective view illustrating an example of movement of the cabinets of the previous FIGS. 9-20 in an example production environment.

According to an important characteristic of the present invention illustrated in FIG. 21, the cabinet A with automated drawers C is moreover prearranged for being conveniently conveyed by an AGV 71 (FIG. 21) in such a way that the cabinets A may be freely positionable according to the production requirements in the proximity of any selected one of the assembly station 2 of the production line. Illustrated by way of example in FIG. 21 is the case where the module A is transferred from a stationary support above the AGV 71. Alternatively, the module A can be transferred from the stationary support to a movable carriage, either manually or by means of any motor-driven movement system.

Thanks to the characteristics referred to above, the production line proposed previously by the present applicant is further improved according to the present invention, since it presents a better efficiency as regards to how the operators are supplied with the parts and components that are necessary to them during execution of a working cycle and it improves the logistics of distribution of the aforesaid parts and components to the various assembly stations in an industrial plant.

Of course, without prejudice to the principle of the invention, the details of construction and the embodiments may vary widely with respect to what has been described herein purely by way of example, without thereby departing from the scope of the present invention.

What is claimed is:

1. A production line comprising:
    at least one assembly station;
    a chain-conveyor device comprising a chain for conveying a plurality of pallets along said production line, wherein each pallet is operable to convey parts to be assembled;
    a motor means operable to move said chain; and
    an electronic control system;
    said motor means and said electronic control system operable to feed the pallets conveyed by said chain with continuous movement through said at least one assembly station;
    a tool positioned adjacent said at least one assembly station guided on a supporting structure and freely mobile in a direction of conveyance of the pallets, said tool operable by an operator positioned in the at least one assembly station for carrying out manual assembly operations on the parts conveyed by each pallet, said tool operable to be pulled by the operator while the operator follows the pallet in its continuous movement through the at least one assembly station, for carrying out the manual assembly operations;
    said chain further includes a front hook assembly and a rear hook assembly set longitudinally apart from one another, each of the front hook assembly and the rear hook assembly operable to engage the pallet for referencing the pallet with respect to said chain and for feeding the pallet together with the chain;
    said rear hook assembly operable to disengage from the pallet when an obstacle prevents the pallet from advancing together with the chain, said rear hook assembly further operable to position a first interception element in a path of a first optical beam emitted by a first optical sensor on disengagement of the rear hook assembly from the pallet;
    said electronic control system being programmed and operable to generate a control signal when said first optical beam is intercepted by said first interception element;
    said production line further comprises at least one module comprising a plurality of part-holder containers operable to supply parts to said at least one assembly station, wherein said part-holder containers further comprise a plurality of drawers engaged to a paternoster conveyor system engaged to the module.

2. The production line according to claim 1, wherein said paternoster conveyor system comprises a chain-transmission system operable to convey said drawers, said chain-transmission system comprises two lateral endless chains respectively connected to opposing side walls of said drawers, said two lateral endless chains engaged on respective chain wheels each rotatably mounted on a load-bearing structure of said module and connected to an electronically controlled driving motor.

3. The production line according to claim 2, wherein said two lateral endless chains each include a front vertical branch, a rear vertical branch, a top horizontal branch, and a bottom horizontal branch defining an endless loop-path, said drawers positioned at a fixed pitch along the endless loop path.

4. The production line according to claim 3, wherein each of said drawers further comprises a first engagement element connected to a respective drawer side wall, each of said first engagement element engaged with a second engagement element connected to a respective one of the two lateral endless chains thereby supporting and selectively moving each drawer by said chain-transmission system when said driving motor is activated along the endless-loop path, each drawer operable to move in a step of ascent along the rear vertical branch and a step of descent along the front vertical branch.

5. The production line according to claim 4, wherein said load-bearing structure further comprises lateral guide rails engaged with the drawers, each guide rail operable to define an endless loop and mounted in the proximity of a respective one of the two lateral endless chains; and each said drawer further comprising a wheel rotatably connected to a respective sidewall, each wheel engaged in a respective lateral guide rail.

6. The production line according to claim 5, wherein said lateral guide rails are configured in such a way that said drawers are positioned in a horizontal orientation along said endless-loop path except for a portion of said step of descent, wherein said drawers are positioned to tilt forwards and downwards relative to the horizontal orientation, to favour access to each drawer by the operator.

7. The production line according to claim 5, wherein each drawer further comprises a drawer-carrying structure engaged with the drawer, the drawer-carrying structure further comprises an open bottom, wherein said first engagement element and said wheel are mounted on side walls of said drawer-carrying structure.

8. The production line according to claim 2, wherein the production line further comprises an electronic control unit operable to control said driving motor according to a predetermined program including at least one safety movement arrest control signal and a control signal indicating the position of each drawer along an endless-loop path.

9. The production line according to claim 8, wherein each drawer further comprises a microchip in communication with said electronic control unit, for reading/writing information regarding traceability of parts contained in the drawers.

10. The production line according to claim 2, wherein said load-bearing structure further comprises a bottom wall, a top wall and two side walls each connected to the top wall and the bottom wall, the top, bottom and side walls defining an access opening to enable the operator access to the parts positioned in said plurality of drawers.

11. The production line according to claim 10, wherein said driving motor transmits motion to a chain wheel of a first of said two lateral endless chains, and a transmission shaft mounted in the proximity of the bottom wall of said load-bearing structure transmits the motion to a chain wheel of a second of said two lateral endless chains.

12. The production line according to claim 10, wherein said module is operable to selectively engage, move and be positionally located by one of an automated guided vehicle (AGV), or a movable carriage, or manually, or a motor-driven movement system, in such a way that said module can be positioned according to the production needs in the proximity of a selected assembly station.

13. A production line comprising:
an assembly station;
a plurality of pallets operable to support assembly components being sequentially assembled;
a chain conveyor for moving the plurality of pallets through the assembly station;
a tool positioned adjacent the assembly station, the tool selectively movable by an operator along with the assembly pallets positioned in the assembly station;
a module operable to selectively supply parts to an operator in the assembly station, the module further comprising:
a top or a bottom wall;
a first side wall and a second side wall each connected to the top wall or the bottom wall;
a paternoster conveyor including a first lateral endless chain connected to the first side wall and a second lateral endless chain connected to the second side wall, the first and second lateral endless chains defining an endless-loop path; and
a first lateral guide rail connected to the first side wall and a second lateral guide rail connected to the second guide wall, each of the first and the second lateral guide rails defining a step of descent; and
a plurality of drawers connected to the first lateral endless chain and the second lateral endless chain in a fixed pitch relative to one another, the drawers further engaged with the first lateral guide rail and the second lateral guide rail, the plurality of drawers selectively positioned relative to the assembly station to selectively supply the parts to the operator in the assembly station for connection to the assembly components.

14. The production line of claim 13 wherein each of the plurality of drawers further comprises:
a first engagement element connected to each of opposing sidewalls facing respective first and second lateral endless chains;
a wheel connected to each of the opposing sidewalls, wherein each of the first engagement elements engage with a second engagement element connected to a respective one of the first and second lateral endless chain and each wheel engages a respective one of the first or the second lateral guide rails.

15. The production line of claim 14 wherein the wheels positioned on the opposing side walls of each drawer are positioned at different vertical heights from each other.

16. The production line of claim 15 wherein the first and the second lateral guide rails step of descent defines an S-configuration, wherein on movement of the respective drawer wheels through the respective guide rail step of descent, a portion of the drawer facing the assembly station moves angularly downward with respect to the workstation to provide increased access of the parts to the operator.

* * * * *